United States Patent
Shimanaka et al.

(10) Patent No.: US 9,988,480 B2
(45) Date of Patent: Jun. 5, 2018

(54) PIGMENT DISPERSANT, PRODUCTION METHOD FOR PIGMENT DISPERSANT, AND PIGMENT DISPERSION LIQUID

(71) Applicant: DAINICHISEIKA COLOR & CHEMICALS MFG. CO., LTD., Tokyo (JP)

(72) Inventors: Hiroyuki Shimanaka, Tokyo (JP); Yoshikazu Murakami, Tokyo (JP); Yoichi Tagi, Tokyo (JP)

(73) Assignee: DAINICHISEIKA COLOR & CHEMICALS MFG. CO., LTD., Tokyo (JP)

(*) Notice: Subject to any disclaimer, the term of this patent is extended or adjusted under 35 U.S.C. 154(b) by 0 days. days.

(21) Appl. No.: 15/645,650

(22) Filed: Jul. 10, 2017

(65) Prior Publication Data

US 2017/0306071 A1    Oct. 26, 2017

Related U.S. Application Data

(63) Continuation of application No. 14/439,918, filed as application No. PCT/JP2013/081797 on Nov. 26, 2013, now Pat. No. 9,732,176.

(30) Foreign Application Priority Data

Dec. 11, 2012   (JP) ................ 2012-270238

(51) Int. Cl.
| | | |
|---|---|---|
| C08F 222/10 | (2006.01) | |
| C08F 267/06 | (2006.01) | |
| C08F 290/06 | (2006.01) | |
| C08K 3/04 | (2006.01) | |
| C08K 5/3417 | (2006.01) | |
| C09D 11/101 | (2014.01) | |
| C09D 11/107 | (2014.01) | |
| C09B 67/46 | (2006.01) | |
| C08K 5/3437 | (2006.01) | |
| C08K 5/3462 | (2006.01) | |
| C09D 11/326 | (2014.01) | |
| C09D 17/00 | (2006.01) | |
| C08F 220/18 | (2006.01) | |
| C08K 5/42 | (2006.01) | |

(52) U.S. Cl.
CPC .......... *C08F 267/06* (2013.01); *C08F 222/10* (2013.01); *C08F 290/062* (2013.01); *C08K 5/3417* (2013.01); *C08K 5/3437* (2013.01); *C08K 5/3462* (2013.01); *C09B 67/009* (2013.01); *C09D 7/45* (2018.01); *C09D 11/101* (2013.01); *C09D 11/107* (2013.01); *C09D 11/326* (2013.01); *C09D 17/00* (2013.01); C08F 220/18 (2013.01); C08F 2438/00 (2013.01); C08K 3/04 (2013.01); C08K 5/42 (2013.01); C08K 2201/003 (2013.01)

(58) Field of Classification Search
CPC .. C08F 222/10; C08F 267/06; C08F 290/062; C08F 220/18; C08K 5/3417; C08K 5/3437; C08K 5/3462; C09B 67/009
See application file for complete search history.

(56) References Cited

U.S. PATENT DOCUMENTS

| | | |
|---|---|---|
| 2008/0314292 A1 | 12/2008 | Shimanaka et al. |
| 2009/0234062 A1 | 9/2009 | Kok et al. |
| 2011/0014401 A1 | 1/2011 | Fujimaki et al. |
| 2011/0223529 A1 | 9/2011 | Shimanaka et al. |
| 2013/0023628 A1 | 1/2013 | Niitani et al. |
| 2015/0152212 A1 | 6/2015 | Umemoto |

FOREIGN PATENT DOCUMENTS

| | | |
|---|---|---|
| CN | 1713955 | 12/2005 |
| CN | 103974987 | 8/2014 |
| EP | 2559715 | 2/2013 |
| EP | 2789635 | 10/2014 |
| JP | 9-176511 | 7/1997 |
| JP | 2002-155229 | 5/2002 |
| JP | 2003-238837 | 8/2003 |
| JP | 2006-273974 | 10/2006 |

(Continued)

OTHER PUBLICATIONS

International Search Report, issued in the corresponding PCT application No. PCT/JP2013/081797, dated Mar. 4, 2014, 2 pages.
Ohinese Office Action, issued in the corresponding Chinese application No. 201380064932.6, dated Mar. 23, 2016, 6 pages.

(Continued)

*Primary Examiner* — Irina S Zemel
*Assistant Examiner* — Jeffrey S Lenihan
(74) *Attorney, Agent, or Firm* — Hamre, Schumann, Mueller & Larson, P.C.

(57) ABSTRACT

The present invention provides a pigment dispersant that exhibits high fine dispersibility, stability, and fluidity in a small amount, a pigment dispersion liquid including the pigment dispersant, and a process of producing the pigment dispersant and pigment dispersion liquid. The pigment dispersant contains as a main component, a graft copolymer formed through living radical polymerization using two or more monomers including a methacrylate A having an acidic group or a basic group and a methacrylate-based macromonomer B having a methacrylate residue at one terminal of a particular polymer chain that has a molecular weight of from 500 to 5000. A ratio of a total molar number of the methacrylate-based monomers relative to 1 mol of a polymerization-initiating compound in the raw material monomers is from 20 to 50 mol. A ratio of the B component-derived polymer chain to the graft copolymer is from 50 to 90 mass %.

11 Claims, No Drawings

(56) References Cited

FOREIGN PATENT DOCUMENTS

| | | |
|---|---|---|
| JP | 2007-270089 | 10/2007 |
| JP | 2008-298967 | 12/2008 |
| JP | 2009-024165 | 2/2009 |
| JP | 2009-227839 | 10/2009 |
| JP | 2010-95591 | 4/2010 |
| JP | 2011-068865 | 4/2011 |
| JP | 2011-241259 | 12/2011 |
| JP | 2011-245670 | 12/2011 |
| JP | 2012-036251 | 2/2012 |
| JP | 2012-098381 | 5/2012 |
| JP | 2012-220637 | 11/2012 |
| WO | 2010/013651 | 2/2010 |
| WO | 2011/129078 | 10/2011 |

OTHER PUBLICATIONS

Korean Office Action, issued in the corresponding Korean patent application No. 10-2015-7018618, dated Mar. 29, 2017, 5 pages.
Chinese Office Action, issued in the corresponding Chinese patent application No. 201380064932.6, dated Apr. 19, 2017, 9 pages.
Jones et al., "Thermoresponsive Copolymers of Methacrylic Acid and Poly(ethylene glycol) Methyl Ether Methacrylate", Journal of Polymer Science part A: Polymer Chemistry, vol. 43, pp. 6095-6104, Dec. 2005.
Rungsardthong et al., "Copolymers of amine methacrylate with poly(ethylene glycol) as vectors for gene therapy", Journal of Controlled Release, vol. 73, pp. 359-380, Jun. 2001.
Communication of notice of opposition, issued in the corresponding European patent No. 2933297, dated Feb. 19, 2018.
Page 51 of Petrochemical Products General Catalog of NOF Corporation, 7 pages, Dec. 15, 2016 (Chemical formulas, which are the same as English ones, of the products are listed.).

PIGMENT DISPERSANT, PRODUCTION METHOD FOR PIGMENT DISPERSANT, AND PIGMENT DISPERSION LIQUID

TECHNICAL FIELD

The present invention relates to a pigment dispersant that constitutes a pigment dispersion liquid used as a pigment coloring agent in oil-based inks, paints, coating agents, and so on, a method for producing a pigment dispersant, and a pigment dispersion liquid that is useful as a pigment coloring agent for inks, paints, and so on obtained by using the pigment dispersant.

BACKGROUND ART

In recent years, inks, paints, and coating agents used for image displays or as image-recording agents have been required to exhibit high image quality, high definition image, and high printability, and therefore a pigment dispersion liquid in which a pigment is finely dispersed has been demanded. Specific applications of the pigment dispersion liquid include pigment dispersion liquids for water-based inkjet inks, pigment dispersion liquids for coloring agents used for color filters, pigment dispersion liquids for ultraviolet ray curable type inkjet inks, pigment dispersion liquids for gravure inks, and so on. The pigment dispersion liquid in the present invention means a liquid containing a pigment dispersed at a high concentration in water, an organic solvent, or a polymerizable compound. For example, the pigment dispersion liquid containing a pigment dispersed at a high concentration is used as a coloring agent and is contained in a medium such as water-based medium, oil-based medium, or a resin, thereby making it possible to manufacture a product as a pigment dispersion liquid composition such as an ink or a paint in which the pigment is finely dispersed, the composition containing the pigment dispersion liquid as a constituent component.

The pigment dispersion liquid is used as a coloring agent in the inks and so on, and it is strongly desired that the pigment be highly dispersed and the dispersion state be maintained particularly in the above-listed applications. Therefore, pigment dispersants the structures of which vary from one dispersant to another have been developed, and the pigment dispersant that exhibits a higher degree of fine dispersibility, stability, and fluidity as required performance has been demanded (see, for example, Patent Literatures 1, 2, and 3). Moreover, a pigment dispersant that makes use of an acryl-based polymer has been known as one of these pigment dispersants. And in the methods for producing the acryl-based polymer to be used in such a case, various kinds of living radical polymerization methods have been invented for controlling the structure, however the technology has been applied not only for producing a pigment dispersant but also for producing an adhesive, an elastomer, or the like (for example, Patent Literature 4).

CITATION LIST

Patent Literature

Patent Literature 1: Japanese Patent Laid-Open No. 2008-298967

Patent Literature 2: Japanese Patent Laid-Open No. 2007-270089

Patent Literature 3: Japanese Patent Laid-Open No. 9-176511

Patent Literature 4: Japanese Patent Laid-Open No. 2011-68865

SUMMARY OF INVENTION

Technical Problem

The present invention intends to provide: a pigment dispersant that exhibits the effect in a small amount of addition to pigments and that is capable of achieving a high degree of fine dispersibility, stability, and fluidity which have never been able to be achieved with the conventional pigment dispersants when the pigment is dispersed in water, an organic solvent, or a polymerizable compound; and an excellent pigment dispersion liquid that is obtained by dispersing a pigment using the pigment dispersant and that is applicable to a wide variety of products for which a high degree of dispersibility is desired. Besides, the present invention also intends to provide a technology that makes it possible to obtain the above-described pigment dispersant having excellent performance by making use of a living radical polymerization method: which is environmentally friendly; the process of which is simple and easy; and which is advantageous in terms of cost.

Solution to Problem

The above objects are achieved by the following present invention. That is to say, the present invention provides a pigment dispersant comprising, as a main component, a polymer obtained by subjecting particular monomers to living radical polymerization using a polymerization-initiating compound, wherein the polymer is a graft copolymer formed through the living radical polymerization using two or more monomers comprising at least: a methacrylate (A) having an acidic group or a basic group; and a methacrylate-based macromonomer (B) having a methacrylate residue at one terminal of any one of polymer chains having a molecular weight of from 500 to 5000 and being selected from the group consisting of polyalkylene (C2 to C4) glycol chains, polyalkylene (C2 to C4) glycol monoalkyl (C1 to C18) ether chains, and poly(hydroxyalkyl (C2 to C18) carboxylic acid) chains, in a ratio so that the total number of moles of the methacrylate-based monomers in the raw material monomers is from 20 to 50 mol based on 1 mol of the polymerization-initiating compound, the graft copolymer having: a main chain with the methacrylate (A)-derived acidic group or basic group bonded thereto; and a side chain being the macromonomer (B)-derived polymer chain, and a proportion of the polymer chain constituting the graft copolymer and being selected from the group consisting of polyalkylene (C2 to C4) glycol chains, polyalkylene (C2 to C4) glycol monoalkyl (C1 to C18) ether chains, and poly(hydroxyalkyl (C2 to C18) carboxylic acid) chains in the graft copolymer is from 50 to 90 mass % expressed as a mass ratio.

Preferable embodiments of the pigment dispersant of the present invention include the followings. The pigment dispersant wherein a ratio of the methacrylate-based macromonomer (B) in the total number of moles of the methacrylate-based monomers is from 10 to 50% based on the total number of moles of the methacrylate-based monomers; and the pigment dispersant wherein the polymer as the main component has a number average molecular weight of from 5000 to 25000 and has an acid value of from 15 to 70 mgKOH/g or an amine value of from 15 to 70 mgKOH/g.

Moreover, the present invention provides, as another embodiment, a method for producing a pigment dispersant comprising, as a main component, a polymer obtained by subjecting particular monomers to living radical polymerization using a polymerization-initiating compound, the method comprising:

obtaining the polymer by subjecting monomers to living radical polymerization under the presence of the polymerization-initiating compound and a catalyst, using, as raw materials, two or more monomers comprising at least: a methacrylate (A) having an acidic group or a basic group; and a methacrylate-based macromonomer (B) having a methacrylate residue at one terminal of any one of polymer chains having a molecular weight of from 500 to 5000 and being selected from the group consisting of polyalkylene (C2 to C4) glycol chains, polyalkylene (C2 to C4) glycol monoalkyl (C1 to C18) ether chains, and poly(hydroxyalkyl (C2 to C18) carboxylic acid) chains, and constituting the monomers in a ratio so that the total number of moles of the methacrylate-based monomers in the monomers is from 20 to 50 mol based on 1 mol of the polymerization-initiating compound and also constituting the monomers so that a proportion of the polymer chain in the formed polymer is from 50 to 90 mass % expressed as a mass ratio.

Moreover, the present invention provides, as yet another embodiment, a method for producing a pigment dispersant comprising, as a main component, a polymer obtained by subjecting particular monomers to living radical polymerization using a polymerization-initiating compound, the method comprising:

obtaining the polymer by reacting a polymer (E) having an epoxy group and/or an isocyanate group, the polymer (E) obtained by subjecting at least one or more monomers comprising a methacrylate (D) having an epoxy group and/or a methacrylate (D) having an isocyanate group to living radical polymerization under the presence of the polymerization-initiating compound and a catalyst using the monomers in a ratio so that the total number of moles of the methacrylate-based monomers is from 20 to 50 mol based on 1 mol of the polymerization-initiating compound with:

a compound (F) having anyone of functional groups selected from the group consisting of a hydroxy group, a primary amino group, a secondary amino group, and a carboxyl group and having an acidic group and/or a basic group; and a compound (G) having one of functional groups selected from the group consisting of a hydroxy group, a primary amino group, a secondary group, and a carboxyl group at a terminal thereof, and having any one of polymer chains having a molecular weight of from 500 to 5000 and being selected from the group consisting of polyalkylene (C2 to C4) glycol chains, polyalkylene (C2 to C4) glycol monoalkyl (C1 to C18) ether chains, and poly(hydroxyalkyl (C2 to C18) carboxylic acid) chains, using the compound (G) so that a proportion of the compound (G)-derived polymer chain in the formed polymer is from 50 to 90 mass % expressed as a mass ratio.

A preferable embodiment of the method for producing a pigment dispersant of the present invention includes the method for producing a pigment dispersant, wherein the polymerization-initiating compound used in the step of conducting living radical polymerization is at least any one of iodine and an iodine compound, and the catalyst used in the step is at least one compound selected from the group consisting of phosphorus halides, phosphite-based compounds, phosphinate compounds, imide-based compounds, phenol-based compounds, diphenylmethane-based compounds, and cyclopentadiene-based compounds.

Moreover, the present invention provides, as another embodiment, a pigment dispersion liquid obtained by dispersing the pigment dispersant according to any one of the above-described pigment dispersants and a pigment in one or more liquid media selected from the group consisting of water, organic solvents, and polymerizable compounds.

A preferable embodiment of the pigment dispersion liquid of the present invention includes the pigment dispersion liquid, further comprising a dye derivative, wherein the dye derivative is a dye derivative having a basic group when the methacrylate (A) having an acidic group or a basic group and being a synthetic raw material of the polymer being the main component of the pigment dispersant is a methacrylate having an acidic group, and the dye derivative is a dye derivative having an acidic group when the methacrylate (A) having an acidic group or a basic group is a methacrylate having a basic group.

Advantageous Effects of Invention

According to the present invention, it becomes possible to provide a pigment dispersant that exhibits the effect in a small amount of addition to pigments and that is capable of achieving a high level of fine dispersibility, stability, and fluidity which have never been able to be achieved with the conventional pigment dispersants when the pigment is dispersed in water, an organic solvent, or a polymerizable compound. According to the present invention, a pigment dispersion liquid in which a pigment is finely dispersed to a high degree by making use of the excellent pigment dispersant, and as a result, by using the pigment dispersion liquid as, for example, a coloring agent for a color resist used for color filters, a pigment coloring agent for water-based or oil-based inkjet inks, or the like, it becomes possible to provide a pigment dispersion liquid composition in which the pigment is finely dispersed at an extremely high level required in these applications. According to the present invention, the pigment dispersant provided by the present invention exhibits an effect in a small use amount to the pigment, and the pigment dispersion liquid to be obtained imparts high degree of fine dispersibility that has never been existed so far, and therefore when the pigment dispersion liquid is used for the aforementioned applications such as image displays or image-recording agents, the high image quality and high definition image which have never been able to be achieved so far can be obtained by the resultant products, thereby making it possible to form an excellent image. Moreover, the pigment in the pigment dispersion liquid using the pigment dispersant of the present invention exhibits a high storage stability with which a finely-dispersed state of the pigment is maintained over a long period of time, and furthermore the viscosity of the pigment dispersion liquid is made low even though the pigment dispersion liquid contains the pigment at a high concentration, and therefore the following excellent effect can be obtained. That is to say, the pigment dispersion liquid gives a high fluidity that is advantageous for handling of the pigment dispersion liquid and application to an article (product), and therefore it becomes possible to provide a product as an extremely excellent pigment dispersion liquid when the pigment dispersion liquid is applied to various kinds of products.

Moreover, the pigment dispersant of the present invention can be obtained only by the simple production method of the present invention in which specific monomers are subjected to living radical polymerization under particular conditions.

With the living radical polymerization, polymerization of vinyl-based monomers having an acidic group or an amino group is made possible, however the living radical polymerization method that is utilized in the present invention is an easy polymerization method that can be conducted without the need for special materials by just adding a polymerization-initiating compound and a catalyst in the conventional radical polymerization, does not require a special production facility and material purification, and therefore is advantageous in terms of cost and environmental friendliness.

DESCRIPTION OF EMBODIMENTS

Next, the present invention will be described in detail giving preferable embodiments of the present invention. The present inventors have diligently proceeded with studies on the aforementioned problems of the conventional technologies to find out that a polymer formed through living radical polymerization and having a specific structure becomes a polymer having extremely useful properties as a pigment dispersant capable of solving the problems of the conventional technologies, and have reached the present invention. More specifically, the present inventors have found that a pigment dispersion liquid that is capable of exhibiting an excellent effect in a small amount of addition to pigments and that makes it possible to realize all the performance of high degree of fine dispersibility, stability, and fluidity with respect to the pigment in the media can be made by using the pigment dispersant of the present invention containing the polymer. Moreover, the present inventors have found that products obtained by using the pigment dispersion liquid as a pigment coloring agent, such as inks, particularly color resists and inkjet inks each obtained by using the pigment dispersion liquid as a coloring agent for color filters exhibit high image quality, high definition image, and high printability, and have completed the present invention.

The polymer, described in detail, that is a main component of the pigment dispersant of the present invention contains, as constituent components, at least a methacrylate-based macromonomer (B) having a methacrylate residue that is a radically polymerizable group at one terminal of the polymer chain selected from the specific group and a methacrylate (A) that is a monomer having an acidic group or a basic group, and is obtained by polymerizing these monomers. Specifically, the polymer is a graft copolymer obtained by using, as raw materials, at least the methacrylate (A) and the macromonomer (B) having a methacrylate residue having a specific polymer chain, and polymerizing these radically polymerizable monomers, the graft copolymer constituted from a main chain to which the methacrylate (A)-derived acidic or basic group is bonded and a side chain that is the macromonomer (B)-derived specific polymer chain having a molecular weight of from 500 to 5000 and being selected from the specific group. The structure of the graft copolymer is obtained through living radical polymerization as an essential method, as mentioned below.

That is to say, since it is possible to precisely control the molecular weight of a polymerized product of monomers in the living radical polymerization, the polymer that characterizes the present invention is made so as to have a structure in which the molecular weights of the main chain obtained by polymerizing radically polymerizable groups are even and uniform by making use of the living radical polymerization. Furthermore, the polymer that characterizes the present invention is easily obtained by making use of the living radical polymerization and being formed by conducting polymerization using at least the above-described two kinds of specific methacrylate-based monomers having a methacrylate residue as a radically polymerizable group in a ratio so that the total number of moles of the methacrylate-based monomers in the raw material monomers is from 20 to 50 mol based on 1 mol of the polymerization-initiating compound. Furthermore, in obtaining the polymer, the monomer raw materials are constituted so that the proportion of the macromonomer (B)-derived particular polymer chain specified in the present invention in the formed polymer is from 50 to 90 mass % expressed as a mass ratio. The polymer that is thus formed and characterizes the present invention has, as a result, a relatively short main chain as molecular chain length and has a polymer main chain the molecular weights of which are uniform. And the structure has the short main chain the molecular weights of which are uniform and the macromonomer (B)-derived polymer chain having about the same molecular length as that of the main chain and being branched repeatedly.

<Structure and Action of Pigment Dispersant>

The pigment dispersant of the present invention contains, as a main component, a graft copolymer obtained through living radical polymerization using at least two kinds of monomers as constituent components, a macromonomer (B) (hereinafter, also simply referred to as macromonomer (B) or B component) having a methacrylate residue that is a radically polymerizable group at a terminal thereof and a methacrylate (A) (hereinafter, also simply referred to as methacrylate (A) or A component) having an acidic group or a basic group, and using the methacrylate-based monomers in a particular molar ratio based on the polymerization-initiating compound. The present invention makes it possible to realize the above-described polymer structure that is intended in the present invention and is effective as a pigment dispersant having excellent performance as a result of skillfully making use of capability of adjusting the molecular weight and obtaining a polymer the molecular weights of which are uniform, which are the characteristics of the living radical polymerization, by using the polymerization-initiating compound and adjusting the amount thereof. Specifically, the present invention realizes the polymer structure having a short main chain the molecular weights of which are uniform, having a large number of the macromonomer (B)-derived polymer chains being branched from the main chain, and being useful as a pigment dispersant by adjusting the balance of the amounts of the polymerization-initiating compound and the methacrylate residue that is a radically polymerizable group and is contained in the methacrylate (A) and the macromonomer (B), which are used in the living radical polymerization. In conducting the living radical polymerization, when the living radical polymerization is conducted using, as the methacrylate (A), a methacrylate having an acidic group, the pigment dispersant becomes an acidic pigment dispersant in which an acidic group is bonded to the main chain, and when a methacrylate having a basic group is used as the methacrylate (A), the pigment dispersant becomes a basic pigment dispersant in which a basic group is bonded to the main chain.

In the living radical polymerization, polymerization-initiating compounds having a group that easily dissociates as a radical are generally used. For example, the living radical polymerization is expressed by the following reaction formula (1) as a general formula, where the polymerization-initiating compound is represented by R—X.

 formula (1)

Due to heat, light, or a catalyst, X is detached from the above-described R—X to produce a radical of R, and one molecule of a monomer is inserted to the radical of R. If, for example, usual radical polymerization is conducted in this state, the chain transfer occurs before radical deactivation and another monomer is inserted, and finally the radical is deactivated by a termination reaction. Moreover, since the lifetime of the radical is short as described above, the chain transfer cannot be controlled, and a polymer to be obtained in such a case has molecular weights ranging from small to large, and the molecular distribution of such a polymer becomes broad. On the other hand, in the living radical polymerization, the reaction is deviated to the left side in the previously described formula, and since X is added immediately after the monomer is inserted to stabilize the radical, the termination reaction doesn't occur. Subsequently, X is detached again due to heat, light, or the catalyst, a radical is generated at a terminal where X is detached, then a monomer is inserted, and X is bonded again to stabilize a radical. And since the radicals are evenly generated probabilistically, the molecular weights become uniform. Besides, the polymerization-initiating compound becomes a start point of the polymerization, then the molecule extends its length therefrom, and therefore the molecular weight can be controlled by the amount of the polymerization-initiating compound.

The present invention realizes to obtain a polymer which has the main chain with a small molecular weight and in which the molecular weights are uniform, by making use of the living radical polymerization and adjusting the balance of the amounts of the polymerization-initiating compound and methacrylate that is a radically polymerizable group and constitutes the monomers used for polymerization. And according to the studies conducted by the present inventors, the specific balance of the amounts that is important for achieving the objects of the present invention is that the constitution of the monomers to be raw materials is made so that the number of moles of the methacrylate residue that is a radically polymerizable group is from 20 to 50 mol expressed by a molar ratio to 1 mol of the polymerization-initiating compound. When the specific monomers are polymerized in such balance of the amounts, it becomes possible to form a main chain which has an average degree of polymerization of from 20 to 50, and in which the molecular weights are uniform. For example, when the molecular weight of the methacrylate residue is set to the molecular weight of the residue having the following structure, the molecular weight is 85, and the molecular weight of the main chain becomes from 1700 to 4250, thereby making it possible to make a main chain having a relatively low molecular weight.

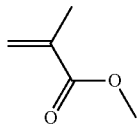

The present inventors have found based on the above-described knowledge that a polymer having a specific structure and being capable of exhibiting a high functionality as a pigment dispersant can be made by making use of the living radical polymerization and an appropriate proportion (balance of amounts) of the polymerization-initiating compound and the methacrylate residue during the polymerization, and have reached the present invention. Specifically, the polymer that characterizes the present invention is formed through living radical polymerization using, as constituent components, two or more monomers containing at least: a methacrylate (A) having an acidic group or a basic group; and a methacrylate-based macromonomer (B) having a methacrylate residue at one terminal of at least any one of polymer chains having a molecular weight of from 500 to 5000 and being selected from the group consisting of polyalkylene (C2 to C4) glycol chains, polyalkylene (C2 to C4) glycol monoalkyl (C1 to C18) ether chains, and poly (hydroxyalkyl (C2 to C18) carboxylic acid) chains. Furthermore, when the polymer that characterizes the present invention is formed through living radical polymerization, it is required that the monomers constituted so that the proportion of the (B) component-derived polymer chain in the formed polymer is from 50 to 90 mass % expressed as a mass ratio be subjected to living radical polymerization. As a result thereof, the polymer that characterizes the present invention becomes a graft copolymer having a particular polymer structure: in which the A component-derived acidic group or basic group is introduced to the main chain; the main chain of which has a relatively small molecular weight and has uniform molecular weights; and, in addition to the main chain, which further has, as side chains, a large number of polymer chains being derived from the macromonomer that is the B component and being branched from the main chain.

The graft copolymer has the specific constitution and therefore exhibits a high functionality when utilized as a pigment dispersant as described below. First of all, since the main chain of the graft copolymer has the A component-derived acidic group or basic group, the main chain is capable of becoming a polymer part (adsorption part) that is adsorbed to a pigment due to adsorption action such as an ionic bond or a hydrogen bond. Specifically, when the main chain has an acidic group, the acidic group becomes a group having adsorptivity to exhibit the action of being adsorbed to the pigment by forming an ionic bond with a basic group on the surface of a basic pigment or a dye derivative-treated pigment having a basic group. Moreover, when the main chain of the pigment dispersant has a basic group, the basic group becomes a group having adsorptivity to exhibit the action of being adsorbed to the pigment by forming anionic bond with an acidic group on the surface of an acidic pigment or a dye derivative-treated pigment having an acidic group. The main chain of the graft copolymer, as described above, exhibits the action of being adsorbed to various basic or acidic pigments, works as a chain to be adsorbed to pigments, and, as a result thereof, the graft copolymer becomes a polymer with which high degree of fine dispersion of pigments can be achieved.

According to further studies conducted by the present inventors, when the molecular weight of the main chain is too small, the adsorption part is too small and therefore the graft copolymer is inferior in adsorptivity to pigments, on the other hand, when the molecular weight of the main chain is too large, it sometimes occurs that the dispersant is adsorbed to a plurality of pigment particles (adsorption to multi-pigment particles) resulting in failure in achieving fine dispersion or resulting in aggregation of pigments after a long period of storage. It is necessary from the above-described reasons that the main chain have a certain range of molecular weight. In order to achieve this, the number of moles of the methacrylate residue in the monomers to be raw materials for use in polymerization (the total number of moles of the methacrylate-based monomers) based on 1 mol of the polymerization-initiating compound is specified so as to be from 20 to 50 mol in the present invention. That is to say, since the graft copolymer that characterizes the present invention is obtained through living radical polymerization designing the monomers in a manner as described above, the main chain of the graft copolymer has a low molecular weight that is around the aforementioned molecular weight (from 1700 to 4250). By the similar reasons described previously, when the total number of moles of the methacrylate residue is smaller than 20 mol, the adsorption part is too small resulting in insufficient adsorptivity, on the other hand, when the total number of moles of the methacrylate residue is 50 mol or more, there is a possibility that the adsorption to multi-pigment particles occurs resulting in failure in achieving fine dispersion or resulting in deficiency of storage stability. A more preferable range of the total number of moles of the methacrylate residue in the present invention is from 25 to 40 mol based on 1 mol of the polymerization-initiating compound.

According to the studies conducted by the present inventors, it is preferable that the molecular weights of the main chain of the polymer are uniform in order to enhance the performance as the pigment dispersant. That is to say, when the molecular weights of the main chain are not uniform and polymer chains ranging from large to small in terms of the molecular weight are contained in the main chain, specifically a large number of polymer chains having a molecular weight exceeding the range of the molecular weight of the main chain or having a molecular weight smaller than the range of the molecular weight of the main chain are contained in the main chain, it is difficult for the polymer to become a high performance pigment dispersant that is a target of the present invention. On the other hand, in the present invention, the molecular weight of the main chain to be formed can be determined by specifying the total number of moles of the methacrylate residue for use in polymerization in a particular range based on 1 mol of the polymerization-initiating compound, and furthermore the useful polymer that characterizes the present invention is formed by adopting the living radical polymerization that is capable of making the molecular weights of the main chain uniform, which are the major characteristics of the present invention.

On the other hand, since it is difficult to control the structure and molecular weight of the polymer with the conventional living radical polymerization, even though the monomers that are the same as the monomers to be used in the present invention are polymerized through the conventional living radical polymerization, the structure of the graft copolymer that characterizes the present invention cannot be obtained because the molecular weight of the main chain becomes too large, thereby increasing the viscosity of a polymerization solution or making the polymerization liquid gelled due to the structural viscosity, or because the terminal of the high molecular weight macromonomer is hard to contribute to the polymerization and the macromonomer as the raw material is left unreacted. The present invention makes use of the living radical polymerization, and the characteristic of the living radical polymerization is that the living radical polymerization is a reaction of a terminal group and the polymerization is controlled. And due to the characteristic, the degree of polymerization extends uniformly, and the radically polymerizable groups are being consumed as the polymerization proceeds, and therefore a polymer to be formed becomes a graft copolymer having a multi-branched structure that characterizes the pigment dispersant of the present invention.

Moreover, it is preferable that the acid value or amine value of the whole graft copolymer that constitutes the pigment dispersant of the present invention is from 15 to 70 mgKOH/g, although the preferable range varies depending on the balance between the main chain and the side chain, which makes it difficult to say definitely. When the amount of the acidic group or basic group is within such a range, it is possible to make the main chain that is favorably adsorbed to pigments. Moreover, when focus is exclusively put on the main chain part of the graft copolymer, it is analogized that acidic groups or basic groups densely exist in the main chain when the acid vale or amine value is within the above-described range. It is preferable that the acid value or amine value in the main chain only is from 70 to 450 mgKOH/g, and this means that the main chain is made of a polymer chain having a high acid or basic value. The graft copolymer that constitutes the pigment dispersant of the present invention exhibits the action of being strongly adsorbed to the pigment due to the dense existence of the acidic groups or basic groups in the main chain, and even though the adsorbed acidic group or basic group in the main chain is desorbed from the pigment, an acidic group or amine group that exists in the vicinity is immediately adsorbed to the pigment to enhance the adsorptivity to the pigment due to the acidic groups or basic groups densely existing in the main chain, and, as a result thereof, the storage stability is considered to be enhanced. However, when the acid value or amine value of the whole graft copolymer is less than 15 mgKOH/g, there is a possibility that the adsorptivity is insufficient, on the other hand, it is not preferable that the acid value or amine value of the whole graft copolymer is more than 70 mgKOH/g because there sometimes occurs a case that the acid value or amine value of the main chain is so large that the graft copolymer is insoluble to solvents or the water resistance is insufficient. More preferable range of the acid value or basic value of the whole graft copolymer is from 20 to 50 mgKOH/g.

Next, the graft copolymer (hereinafter, also referred to as pigment dispersant of the present invention) that is a main component of the pigment dispersant of the present invention takes a structure in which, as described previously, a B component-derived particular polymer chain is grafted, as a branch, to the main chain having the constitution as described above. It is considered that the side chain is dissolved in the liquid dispersion medium (also simply referred to as "liquid medium") to cause steric repulsion, thereby preventing the aggregation of pigments, preventing the aggregation of pigments during dispersion by means of mechanical energy in the dispersion liquid, working toward finer dispersion, and exhibiting the effect of achieving a high degree of storage stability due to the steric repulsion. Besides, when the amount of introduction of the branch chain (side chain) relative to the amount of the trunk chain (main chain) is large, very strong steric repulsion is generated, and, as a result thereof, the fine dispersibility and the high degree of stability can be imparted. Moreover, it is considered that a large number of side chains are grafted to the main chain to be in a dense state, thereby making the repulsion force further stronger resulting in achievement of high degree of fine dispersion and dispersion stability of the pigment. In the present invention, the graft copolymer is constituted so that the proportion of the B component-derived polymer chain in the graft copolymer is from 50 to 90 mass % expressed as a mass ratio.

The above-described particular polymer chain that can be the side chain of the pigment dispersant of the present invention is specifically a polymer chain (hereinafter, also referred to as particular polymer chain) having a molecular weight within a range from 500 to 5000 and including glycol chains or polyester chains, such as polyalkylene (number of carbon atoms: C2 to C4) glycol chains and/or polyalkylene (number of carbon atoms: C2 to C4) glycol monoalkyl (number of carbon atoms: C1 to C18) ether chains and/or poly(hydroxyalkyl (number of carbon atoms: C2 to C18) carboxylic acid) chains. These particular polymer chains are preferable because of high solubility to liquid media. The details of the particular polymer chains will be mentioned later.

The molecular weight of the polymer chain such as the glycol chain or the polyester chain is important for imparting fine dispersibility and stability to the pigment dispersion liquid due to the aforementioned steric repulsion of the side chain, and the molecular weight is required to be from 500 to 5000. On the other hand, when the molecular weight is less than 500, the steric repulsion is insufficient and the storage stability becomes deficient, moreover when the molecular weight exceeds 5000, it sometimes occurs that the storage stability becomes, on the contrary, poor. It is considered that the phenomenon occurs because entanglement of the polymer chains is generated when the molecular weight exceeds 5000. Furthermore, when the molecular weight exceeds 5000, it is considered that the number of branches becomes small relative to the amount of introduction of branches and sufficient steric repulsion is not made possible, and it is also considered that the part to be dissolved in the pigment dispersant is too large to thereby increase the solubility of the pigment dispersant as a whole and therefore there is a possibility that even though the main chain is adsorbed to the pigment, the main chain is detached from the pigment. It is more preferable that the molecular weight of the polymer chain is from 1000 to 3000.

Moreover, the molecular weight distribution that is a value obtained by dividing the weight average molecular weight by the number average molecular weight of the pigment dispersant of the present invention is not particularly limited. The reason is because even if the graft copolymer is obtained through living radical polymerization, there is a possibility that the molecular weight distribution of the graft copolymer is measured, due to its structure, as a polymer having a broad molecular weight distribution depending on the spread of the molecule or the position of the graft when the molecular weight of the graft copolymer in a dissolved state is measured by gel permeation chromatography and it is difficult to measure the molecular weight distribution that is inherent to the graft copolymer. The preferable molecular weight distribution taking the reason into consideration is 2 or less, more preferably 1.6 or less.

Moreover, it is preferable for the purpose of generating sufficient steric repulsion that a large number of polymer chains which constitute the side chains of the pigment dispersant of the present invention are branched. Therefore, it is preferable that the macromonomer (B) is used in a molar ratio within a range from 10 to 50% in a total number of moles of the methacrylate residue of from 20 to 50 mol that is used based on 1 mol of the polymerization-initiating compound, namely the macromonomer (B) is used in a molar ratio within a range from 2 to 25 mol. However, the range is different depending on the molecular weight of the polymer chain that constitutes the macromonomer (B). For example, if 2 mol of the macromonomer having a polymer chain the molecular weight of which is 500 is used based on 1 mol of the polymerization-initiating compound (namely, 1 mol of a polymerization-initiating group), the mass ratio of the polymer chain in the macromonomer to the pigment dispersant becomes small, and it is considered that sufficient steric repulsion cannot be obtained. Thus, it becomes important that the mass ratio of the polymer chain is adjusted so as to be from 50 to 90 mass % in the mass of the pigment dispersant for the purpose of obtaining sufficient steric repulsion to achieve the remarkable effect of the present invention. When the mass ratio is less than 50 mass %, sufficient repulsion is not obtained and the storage stability becomes poor, and when the mass ratio exceeds 90 mass %, the amount of the main chain that is an adsorption part becomes relatively small, and fine dispersion and storage stability at a high level are not achieved.

Moreover, regarding the molecular weight of the graft copolymer that is a main component of the pigment dispersant of the present invention, it is preferable that the graft copolymer have a number average molecular weight of from 5000 to 25000. The value of the number average molecular weight that is less than 5000 shows that the adsorption part of the main chain is small because the effect of the macromonomer (B)-derived polymer chain having a molecular weight of from 500 to 5000 on the molecular weight of the graft copolymer is large, or that the amount of the main chain accounts for the most part of the graft copolymer and the amount of the macromonomer is small. Therefore, it is not preferable that the value of the number average molecular weight is less than 5000 because it sometimes occurs that the adsorptivity to pigments is poor or steric repulsion is not obtained and therefore sufficient fine dispersibility and stability are not obtained. On the other hand, it is not preferable that the value of the number average molecular weight is larger than 25000 because the molecular weight of the polymer is too large and there is a risk that a sufficient effect cannot be obtained as listed below. In this case, firstly, it is considered that the main chain becomes large, however in this case, the molecular weight of the main chain that is an adsorption part is too large, and it becomes difficult to realize the previously described fine dispersion. Or, it is considered that the number of side chains becomes too large or the molecular weight of the side chain becomes large, and in this case, the solubility of the side chain that is a soluble part becomes too higher than the adsorptivity of the main chain, and there is a possibility that even though the dispersant is adsorbed to a pigment, the dispersant is detached from the pigment. Accordingly, both cases are not preferable. According to the studies conducted by the present inventors, more preferable range of the molecular weight of the graft copolymer is from 10000 to 20000.

(Method for Producing Pigment Dispersant)

The main component of the pigment dispersant of the present invention has the aforementioned specific polymer structure, and therefore the pigment dispersant of the present invention becomes a pigment dispersant capable of exhibiting the action and effect originated from the structure thereof. The composition of monomers that become raw materials to form the polymer is required to be two or more monomers containing at least: a methacrylate (A) having an acidic group or a basic group; and a methacrylate-based macromonomer (B) having a methacrylate residue at one terminal of a particular polymer chain having a molecular weight of from 500 to 5000. Furthermore, another radically polymerizable monomer that is copolymerizable with the methacrylate (A) and the macromonomer (B) may be used as a constituent component as necessary.

There are two methods for stably and easily obtaining the graft copolymer that is a main component of the pigment dispersant of the present invention and has a specific structure, and the methods are described below. First of all, the method I that is the first method is a method for obtaining the graft copolymer by subjecting two or more monomers containing at least: a methacrylate (A) having an acidic group or a basic group; and a methacrylate-based macromonomer (B) having a methacrylate residue at one terminal of a particular polymer chain having a molecular weight of from 500 to 5000, specifically at least any one of polymer chains (hereinafter, also simply referred to as "particular polymer chain) selected from the group consisting of polyalkylene (C2 to C4) glycol chains, polyalkylene (C2 to C4) glycol monoalkyl (C1 to C18) ether chains, and poly(hydroxyalkyl (C2 to C18) carboxylic acid) chains, to living radical polymerization under the presence of a polymerization-initiating compound using the two or more monomers in a particular balance as specified in the present invention.

Moreover, by the method II that is the second method, a graft copolymer having a specified structure that characterizes the present invention is obtained in such a way that each compound described below reacts continuously without terminating polymerization by making use of the living radical polymerization. Specifically, by the method II, a polymer (E) having an epoxy group and/or an isocyanate group is obtained through living radical polymerization under the presence of a polymerization-initiating compound using one or more monomers containing at least methacrylate (D) having an epoxy group and/or a methacrylate (D) having an isocyanate group in a ratio so that the total number of moles of the methacrylate-based monomers is from 20 to 50 mol based on 1 mol of the polymerization-initiating compound. And the method II is a method for obtaining a graft copolymer that characterizes the present invention by, subsequently, reacting the polymer (E) with a compound (F) having any one of functional groups selected from the group consisting a hydroxy group, a primary amino group, a secondary amino group, and a carboxyl group and having an acidic group or a basic group and a compound (G) having one of functional groups selected from the group consisting of a hydroxy group, a primary amino group, a secondary amino group, and a carboxyl group and having a particular polymer chain.

In the first place, the method I is described. By the method, the structure of the graft copolymer that characterizes the present invention is obtained through living radical polymerization using at least a methacrylate (A) having an acidic group or a basic group and a macromonomer (B) having a particular polymer chain. In the methacrylate (A) having an acidic group or a basic group and used for introducing an acidic group or a basic group in the main chain of the graft copolymer, the acidic groups include a carboxyl group, a phosphate group, and a sulfonate group. More preferable acidic group is the carboxyl group or the sulfonate group.

The methacrylate having such an acidic group is not particularly limited, however the methacrylates exemplified below can be used. Examples of the methacrylate having a carboxyl group include: methacrylic acid; monomers obtained by reacting a methacrylic acid hydroxy alkyl ester with a polybasic acid such as succinic acid, maleic acid, phthalic acid, 1,2-cyclohexane dicarboxylic acid, trimellitic acid, and pyromellitic acid, or with an acid halide or an acid anhydride thereof; monomers obtained by reacting methacryloyloxy ethyl isocyanate with a compound having an amino group or a hydroxy group, and having a carboxyl group such as, for example, lactic acid; and so on.

Moreover, monomers having a phosphate group include 2-(methacryloyloxy)ethyl phosphate, 3-chloro-2-(phosphonoxy)propyl methacrylate, 2-(methacryloyloxy)propyl phosphate, 2-(phenoxyphosphonyloxy)ethyl methacrylate, acidphosphoxy polyoxyethylene glycol monomethacrylate, acidphosphoxy polyoxypropylene glycol monomethacrylate, and so on. Moreover, bifunctional methacrylates such as bis(2-methacryloyloxyethyl)phosphate can also be used within a range where the obtained copolymer does not cause gelation. Particularly, 2-(methacryloyloxy)ethyl phosphate is suitable for the present invention, because the phosphate has versatility, is sold on the market, and has the smallest molecular weight.

On the other hand, the basic groups in the methacrylate (A) having a basic group acting as a group having adsorptivity to the pigment include an amino group and a quaternary ammonium salt of an amino group formed by a halogenated alkyl or alkyl sulfonate. The methacrylate (A) having a basic group is not particularly limited, and the methacrylates exemplified below can be used. Examples thereof include aminoalkyl methacrylates such as aminoethyl methacrylate, dimethylaminoethyl methacrylate, diethyl aminoethyl methacrylate, and t-butylaminoehtyl methacrylate; methacrylates obtained by reacting glycidyl methacrylate with a secondary amino group such as, for example, diethylamine or diethanolamine; benzyl chlorides thereof, and quaternary methacrylate chlorides thereof formed by diethyl sulfonate, and so on.

Next, the macromonomer (B) having a particular polymer chain is described. The macromonomer (B) is a methacrylate-based macromonomer having a methacrylate residue at one terminal of any one of polymer chains having a molecular weight of from 500 to 5000 and being selected from the group consisting of polyalkylene (C2 to C4) glycol chains, polyalkylene (C2 to C4) glycol monoalkyl (C1 to C18) ether chains, and poly(hydroxyalkyl (C2 to C18) carboxylic acid) chains. The macromonomer is a polymer to be a side chain of the graft copolymer that constitutes the pigment dispersant of the present invention, and the action of solubility to solvents and the steric repulsion effect are exhibited by the macromonomer.

Specific examples of the particular polymer chain include the following polymer chains. Polyalkylene (C2 to C4) glycol chains include: polyethylene glycol; polypropylene glycol; polytetramethylene glycol; and homopolymers, random copolymers and block copolymers each having ethylene glycol, propylene glycol, 1, 3-propanediol, or tetramethylene glycol as a monomer unit. Polyalkylene (C2 to C4) glycol monoalkyl (C1 to C18) ether chains include single terminal methyl ethers, ethyl ethers, lauryl ethers, and stearyl ethers of the above-described polyalkylene (C2 to C4) glycol chains, and so on. Poly(hydroxyalkyl (C2 to C18) carboxylic acid) chains include polylactic acid, polycaprolactone, poly 12-hydroxystearyl acid, and so on. In the present invention, the macromonomer (B) in which a methacrylate residue is bonded at a terminal of these particular polymer chains to form an ester bond is used.

In the method I by which the graft copolymer that is a main component of the pigment dispersant of the present invention is produced, the living radical polymerization is conducted using at least these monomers (A) and (B), however another radically polymerizable monomer (a) that is copolymerizable with these monomers can be used within a range where the structure that characterizes the present invention can be made. As the monomer (a), radically polymerizable monomers including a vinyl-based monomers such as styrene monomers and vinyl acetates, acrylate-based monomers such as ethyl acrylate, methacrylate-based monomers such as methyl methacrylate, amide-based monomers such as acryl amide and methacryl amide, and maleic acid-based monomers such as phenyl maleimide can be used. In the present invention, since the graft copolymer is required to be synthesized through living radical polymerization in order to make the graft copolymer having a specific structure useful for the pigment dispersant, it is preferable that the monomer (a) which is used together with the monomers (A) and (B) is a methacrylate-based monomer. The action of the monomer (a) will be described later.

Methacrylate-based monomers that can be used in this case include, but not particularly limited to, (cyclo)alkyl methacrylates such as methyl methacrylate, ethyl methacrylate, propyl methacrylate, isopropyl methacrylate, butyl methacrylate, 2-methylpropane methacrylate, t-butyl methacrylate, pentyl methacrylate, hexyl methacrylate, octyl methacrylate, 2-ethylhexyl methacrylate, nonyl methacrylate, decyl methacrylate, isodecyl methacrylate, lauryl methacrylate, tetradecyl methacrylate, octadecyl methacrylate, behenyl methacrylate, isostearyl methacrylate, cyclohexyl methacrylate, t-butylcyclohexyl methacrylate, isobornyl methacrylate, trimethylcyclohexyl methacrylate, cyclodecyl methacrylate, cyclodecyl methyl methacrylate, tricyclodecyl methacrylate, and adamantyl methacrylate; aryl methacrylates such as phenyl methacrylate, naphthyl methacrylate, and benzyl methacrylate; alkenyl methacrylates such as allyl methacrylate; hydroxy group-containing methacrylates such as 2-hydroxyethyl methacrylate, 2-hydroxypropyl methacrylate, and polyethylene glycol monomethacrylate; halogen containing methacrylates such as octafluorooctyl methacrylate and tetrafluoroethyl methacrylate; ultraviolet ray-absorbing methacrylates such as 2-(4-benzoxy-3-hydroxyphenoxy)ethyl methacrylate, and 2-(2'-hydroxy-5-methacryloyloxyethylphenyl)-2H-bezotriazole; silicon atom-containing methacrylates having a trimethoxy silyl group or a dimethyl silicone chain; and so on, and one or more kinds of the methacrylate-based monomers can be used. In the method I by which the graft copolymer that constitutes the pigment dispersant of the present invention is produced, the graft copolymer having a specific structure is produced by subjecting the methacrylate-based monomer as constituent component as necessary together with the polymerization-initiating compound to living radical polymerization to obtain the pigment dispersant of the present invention.

As the method for producing the graft copolymer that constitutes the pigment dispersant of the present invention, the method II other than the method I exists. In the method II, a polymer (E) having an epoxy group and/or an isocyanate group is obtained through living radical polymerization under the presence of a polymerization-initiating compound using at least one or more monomers containing a methacrylate (D) having an epoxy group and/or a methacrylate (D) having an isocyanate group in a ratio so that the total number of moles of the methacrylate-based monomers based on 1 mol of the polymerization-initiating compound is from 20 to 50 mol, and then the graft copolymer having a specific structure is obtained by reacting the polymer (E) with: a compound (F) having one of functional groups selected from the group consisting of a hydroxy group, a primary amino group, a secondary amino group, and a carboxyl group and having an acidic group or a basic group; and a compound (G) having one of functional groups selected from the group consisting of a hydroxy group, a primary amino group, a secondary amino group, and a carboxyl group at a terminal thereof and having the previously described specific polymer chain. In the present invention, the compounds to be raw materials are used in the polymerization so that the proportion of the compound (G)-derived polymer chain is from 50 to 90 mass % expressed as a mass ratio.

The details of the method II are described, first of all, the methacrylate (D) having an epoxy group and/or an isocyanate group is at least subjected to living radical polymerization under the presence of a polymerization-initiating compound. Moreover, in conducting the living radical polymerization, the previously described radically polymerizable monomer, preferably the methacrylate as described previously can be copolymerized as necessary. The polymer (E) obtained by the copolymerization is a methacrylate-based polymer in which the methacrylate residue is polymerized in a range from 20 to 50 mol based on 1 mol of the polymerization-initiating compound as described previously, and the obtained polymer (E) is also a methacrylate-based polymer: having an epoxy group and/or an isocyanate group as a functional group; having an average degree of polymerization of 20 to 50 mol; and having a small molecular weight and uniform molecular weights.

The compound (F) having one of functional groups selected from the group consisting of a hydroxy group, a primary amino group, a secondary amino group, and a carboxyl group and having an acidic group or a basic group and the compound (G) having one of functional groups selected from the group consisting of a hydroxy group, a primary amino group, a secondary amino group, and a carboxyl group at a terminal thereof and having a particular polymer chain are reacted with the polymer (E) in order to make a structure which is specific to the graft copolymer that is a main component of the pigment dispersant of the present invention and in which a particular polymer chain having an acidic group and/or a basic group in the main chain is grafted.

The methacrylates having an epoxy group and being used in the polymerization include, but not particularly limited to, glycidyl methacrylate and epoxy cyclohexyl methyl methacrylate. Methacrylates having an isocyanate group include, but not particularly limited to, isocyanatoethyl methacrylate (product name: Karenz MOI manufactured by Showa Denko K.K.) and a methacrylate obtained by using a compound having two isocyanate groups with different reactivity, such as a blocked product of the isocyanate in the isocyanatoethyl methacrylate or isophorone diisocyanate, and reacting 2-hydroxyethyl methacrylate with one of the two isocyanate groups in the compound.

It has been known that a carboxyl group, a primary amino group, a secondary amino group, or a hydroxy group (hereinafter, referred to as functional group b) reacts with an epoxy group or an isocyanate group, and conventionally known methods can be utilized for the reaction and are not particularly limited. And, in order to make the structure of the copolymer to be produced as the structure that characterizes the present invention, the acidic group or the basic group is introduced in the main chain by reacting the polymer (E) obtained in a manner as described above with a compound (F) having a functional group (b) that is capable of reacting with the epoxy group or the isocyanate group in the polymer (E) and having an acidic group or a basic group that functions as a group having adsorptivity to pigments in the pigment dispersant of the present invention.

The compound being used as the compound (F) in conducting the reaction, having an acidic group to be introduced in the main chain, and having a functional group (b) that reacts with the epoxy group or the isocyanate group is not particularly limited. When the acidic group is a carboxyl group, it is preferable that the compound (F) has a functional group (b) having a higher reactivity than the reactivity of the carboxyl group because there is a possibility that the epoxy group or the isocyanate group reacts with the carboxyl group. When the methacrylate has an epoxy group, it is preferable that the compound (F) has a primary amino group or a secondary amino group as a functional group (b). Examples of the compound (F) in this case include aminoethane carboxylic acid, various kinds of amino acids, and so on, and when the methacrylate has an isocyanate group, it is preferable that the compound (F) has a hydroxy group, a primary amino group, or a secondary amino group as a functional group (b), and examples of the compound (F) in this case include the previously described amino acids and hydroxyethane carboxylic acid, and so on. When the acidic group is phosphoric acid or sulfonic acid, any functional group (b) may be used, and examples of the compound (F) in this case include hydroxyethyl phosphoric acid, taurine, hydroxyethyl sulfonic acid, and so on.

The compound being used as the compound (F), having a basic group to be introduced in the main chain, and having the functional group (b) is not particularly limited. In this case, it is preferable that the compound (F) preferably has a tertiary amino group when the basic group is a primary or secondary amino group because the basic group reacts with the isocyanate group or the epoxy group. Examples of the compound include dimethyl aminoethanol, dimethyl aminopropyl amine, aminomethyl pyridine, N-methylaminomethyl pyridine, dimethyl aminoethyl carboxylic acid, and so on, and one or more of the compounds are used.

Moreover, when the polymer (E) has an epoxy group, a monofunctional compound having only a primary amino group or a secondary amino group may be used as the compound (F). The reason is because when the primary or secondary amino group reacts with the epoxy group, a secondary amino group and a hydroxy group are produced in the case of the primary amino group, and a tertiary amino group and a hydroxy group are produced in the case of the secondary amino group, thereby making it possible to introduce the amino group in the main chain. Examples of the compound in this case include, but not particularly limited to, butylamine, dibutylamine, dodecylamine, and so on.

When the whole epoxy group and/or isocyanate group react with the compound (F), the structure of the graft copolymer that constitutes the pigment dispersant of the present invention cannot be made, and therefore the amount of the reaction is adjusted so that the range of moles specified in the present invention is achieved, preferably so that the acid value or the amine value, and the range of moles and the weight of the polymer chain fall within the range as described previously.

Next, the compound (G) having one of functional groups selected from the group consisting of a hydroxy group, a primary amino group, a secondary amino group, and a carboxyl group and having a particular polymer chain is described. The polyalkylene (C2 to C4) glycol chains that constitute the compound (G) include: polyethylene glycol; polypropylene glycol; polytetramethylene glycol; and homopolymers, random copolymers, and block copolymers having ethylene glycol, 1,2-propylene glycol, 1,3-propylene glycol, or tetramethylene glycol as a monomer unit. Moreover, the polyalkylene (C2 to C4) glycol monoalkyl (C1 to C18) ether chains include single terminal methyl ethers, ethyl ethers, lauryl ethers, and stearyl ethers of the above-described polyalkylene (C2 to C4) glycol chains. Moreover, the poly(hydroxyalkyl (C2 to C18) carboxylic acid) chains include polylactic acid, polycaprolactone, poly 12-hydroxystearyl acid, and so on. Besides, the polyalkylene (C2 to C4) glycol monoalkyl (C1 to C18) ether chains include ether chains such as single terminal methyl ethers, ethyl ethers, lauryl ethers, and stearyl ethers of the polyalkylene (C2 to C4) glycol chains having an amino group or a carboxyl group at the other terminal. As the glycol chain having an amino group at a terminal thereof, Jeffamine and Surfonamine (both product name) each manufactured by Huntsman International LLC. are available. One or more of these glycol or ether chains may be used, and there is no particular limitation to these glycol or ether chains.

Moreover, the molecular weight distribution of the polymer (E) is not particularly limited because the structure of the polymer (E) is different from the previously described graft structure, although narrow molecular weight distribution that is a characteristic of the living radical polymerization can be observed. However, the molecular weight distribution is preferably from 1.0 to 1.6, more preferably from 1.0 to 1.3. The graft copolymer that is a main component of the pigment dispersant of the present invention is obtained as a polymer having its specific particular structure by the above-described method I or method II.

<Method for Polymerizing Pigment Dispersant>

The pigment dispersant of the present invention is constituted from the graft copolymer having a small molecular weight and uniform molecular weights in the main chain as mentioned previously, and a living radical polymerization method is chosen as a method for obtaining the main chain. Preferably, the living radical polymerization method includes a step of subjecting the monomer components containing the methacrylate monomers to living radical polymerization under the presence of a polymerization-initiating compound and a catalyst, in which the polymerization-initiating compound is at least any one of iodine and an iodine compound and the catalyst is at least one compound selected from the group consisting of phosphorus halides, phosphite-based compounds, phosphinate compounds, imide-based compounds, phenol-based compounds, diphenylmethane-based compounds, and cyclopentadiene-based compounds.

Various methods for conducting the living radical polymerization have been invented, and the methods include a nitroxide mediated polymerization method (NMP method) making use of dissociation and bonding of an amine oxide radical, an atom transfer radical polymerization method (ATRP method) conducting polymerization using a heavy metal such as copper, ruthenium, nickel, or iron and a ligand that forms a complex with the heavy metal, and further using a halogenated compound as an initiation compound, a reversible addition-fragmentation chain transfer method (RAFT method) and an MADX (Macromolecular Design via Interchange of Xanthate) method both conducting polymerization using a dithiocarboxylic acid ester, a xanthate compound, or the like as an initiation compound and further using addition polymerizable monomer and a radical initiator, a degenerative transfer method (DT method) using a heavy metal such as an organotellurium, an organobismuth, an organoantimony, an antimony halide, an organogermanium, or a germanium halide, and so on. These polymerization method also uses a polymerization-initiating compound and can be applied to the present invention.

However, the above-described methods have problems to obtain the graft copolymer that characterizes the present invention. For example, an amine oxide such as a tetramethylpiperdine oxide radical is used in the NMP method, however it is necessary to conduct polymerization under a high temperature condition of 100° C. or higher, and there is also a problem in the NMP method that the polymerization does not proceed when a methacrylate-based monomer is used.

In the ATRP method, it is necessary to use a heavy metal, and since the ATRP method is a polymerization method accompanied by oxidation and reduction, oxygen needs to be removed, and further in a method for conducting polymerization by forming a complex using an amine compound as a ligand, the formation of the complex is inhibited when an acidic substance is present in the polymerization system and therefore it is difficult to polymerize an addition polymerizable monomer having an acid group as it is. It is necessary that a monomer obtained by protecting the acid group with a protection group be polymerized and the protection group be detached after polymerization, however the process is complicated, and it is not easy to introduce an acid group in a polymer block.

In the RAFT method and the MADIX method, a special compound such as a dithiocarboxylic acid ester or a xanthate compound is necessary in the first place, and since these compounds are sulfur-based compounds, an unpleasant odor peculiar to sulfur is liable to be left in a polymer to be obtained, and it sometimes occurs that the polymer is colored. Therefore, it is necessary to remove the odor or coloration from the obtained polymer. Besides, there sometimes occurs a case that the polymerization of methacrylate-based monomers does not proceed well.

Furthermore, it is necessary to use a heavy metal in the DT method similarly to the ATRP method. Therefore, there is a problem that the heavy metal has to be removed from the obtained polymer, and there is also a problem that waste water which contains the removed heavy metal has to be purified.

Under such circumstances, the polymerization method that is used in the present invention makes it possible to easily carry out production by only using relatively inexpensive materials sold on the market with the use of heavy metals and the purification of polymers being not essential and without the need for synthesizing special compounds. Moreover, the polymerization method that is used in the present invention is a method the polymerization condition of which is calm, and with which polymerization can be conducted under the same conditions as the conventional radical polymerization methods, and it is worthy of mentioning that a monomer having a carboxyl group or a phosphate group is subjected to polymerization as it is.

Specifically, the method for producing the graft copolymer that characterizes the present invention includes a step (polymerization step) of subjecting monomer components containing at least two kinds of specific methacrylate-based monomers to living radical polymerization under the presence of a polymerization-initiating compound and a catalyst. And, the polymerization-initiating compound is at least any one of iodine and an iodine compound. Various functional groups can be used in this living radical polymerization.

In the polymerization step, monomer components containing methacrylate-based monomers are polymerized through living radical polymerization using at least any one of iodine and an iodine compound as a polymerization-initiating compound. When heat or light is applied to the iodine or iodine compound used as a polymerization-initiating compound, an iodine radical is dissociated. And, immediately after a monomer is inserted in the state where the iodine radical is dissociated, the iodine radical is recombined with a radical at the terminal of the polymer to be stabilized, and the polymerization reaction proceeds while preventing the termination reaction.

Specific examples of the iodine compound include: alkyl iodides such as 2-iodo-1-phenyl ethane and 1-iodo-1-phenyl ethane; cyano group-containing iodides such as 2-cyano-2-iodo propane, 2-cyano-2-iodo butane, 1-cyano-1-iodo cyclohexane, 2-cyano-2-iodo-2,4-dimethyl pentane, and 2-cyano-2-iodo-4-methoxy-2,4-dimethyl pentane; and so on.

Commercially available iodine compounds may be used as supplied, however iodine compounds prepared by a conventionally known method may also be used. For example, the iodine compound can be obtained by reacting an azo compound such as azobisbutyronitrile with iodine. Moreover, the iodine compound can also be obtained by reacting an organic halide in which the iodine in the above-described iodine compound is substituted by a halogen atom such as bromine or chlorine with an iodide salt such as a quaternary ammonium iodide or sodium iodide to conduct halogen exchange.

In the polymerization step, a catalyst that is capable of abstracting iodine in the polymerization-initiating compound is used together with the polymerization-initiating compound. As the catalyst, it is preferable to use: a phosphorus-based compound such as a phosphorus halide, a phosphite-based compound, or a phosphinate compound; a nitrogen-based compound such as an imide-based compound; an oxygen-based compound such as a phenol-based compound; and a hydrocarbon-based compound such as a diphenylmethane-based compound and a cyclopentadiene-based compound. In addition, these catalysts can be used alone or in combination of two or more.

Specific examples of the phosphorus-based compound include phosphorus triiodide, diethyl phosphite, dibutyl phosphite, ethoxyphenyl phosphinate, phenylphenoxy phosphinate, and so on. Specific examples of the nitrogen-based compounds include succinimide, 2,2-dimethyl succinimide, maleimide, phthalimide, N-iodo succinimide, hydantoin, and so on. Specific examples of the oxygen-based compound include phenol, hydroquinone, methoxy hydroquinone, t-butyl phenol, catechol, di-t-butylhydroxy toluene, and so on. Specific examples of the hydrocarbon-based compound include cyclohexadiene, diphenylmethane, and so on.

It is preferable to set the use amount (number of moles) of the catalyst to less than the use amount (number of moles) of the polymerization-initiating compound. When the use amount (number of moles) of the catalyst is too large, it sometimes occurs that the polymerization is controlled more than necessary and the polymerization becomes hard to proceed. Moreover, it is preferable that the temperature (polymerization temperature) during the living radical polymerization is set to from 30 to 100° C. When the polymerization temperature is too high, it sometimes occurs that iodine at the polymerization terminal decomposes and the terminal is not stably present to make the living radical polymerization impossible. Moreover, it is preferable in the polymerization method that iodine is bonded to the terminal, a radical is produced by allowing the iodine to dissociate as a radical, and the terminal is stable. Here, in the case of acrylates, vinyl-based monomers, or the like, the terminal is a secondary iodine, and the secondary iodine is hard to dissociate as an iodine radical, and therefore there is a possibility that the polymerization does not proceed or the molecular weight distribution becomes broad. It is possible to allow the iodine to dissociate by raising the temperature, however it is preferable to conduct polymerization mildly in the above-described temperature range from the standpoint of environment and energy. Accordingly, relatively stable tertiary iodides with which radicals are easily generated are more preferable, and methacrylate monomers are suitable in the living radical polymerization that is used in the present invention.

Moreover, a polymerization initiator that is capable of generating a radical is usually added in the polymerization step. As the polymerization initiator, a conventionally known azo-based or peroxide-based initiator is used. In addition, it is preferable to use a polymerization initiator with which a radical is sufficiently generated in the above-described polymerization temperature range. Specifically, it is preferable to use an azo-based initiator such as 2,2'-azobis (4-methoxy-2,4-dimethylvaleronitrile). It is preferable that the use amount of the polymerization initiator is 0.001 to 0.1 times the number of moles of the monomer, more preferably 0.002 to 0.05 times the number of moles of the monomer. When the use amount of the polymerization initiator is too small, it sometimes occurs that the polymerization does not proceed sufficiently. On the other hand, when the use amount of the polymerization initiator is too large, it sometimes occurs that usual radical polymerization that is not the living radical polymerization proceeds as a side reaction.

The living radical polymerization may be bulk polymerization in which an organic solvent is not used, but is preferably solution polymerization in which an organic solvent is used. It is preferable that the organic solvent is capable of dissolving components such as a polymerization-initiating compound, a catalyst, a monomer component, and a polymerization initiator.

Specific examples of the organic solvent include: hydrocarbon-based solvents such as hexane, octane, decane, isodecane, cyclohexane, methylcyclohexane, toluene, xylene, and ethylbenzene; alcohol-based solvents such as methanol, ethanol, propanol, isopropanol, butanol, isobutanol, hexanol, benzyl alcohol, and cyclohexanol; glycol-based solvents such as ethylene glycol, diethylene glycol, propylene glycol, dipropylene glycol, methyl cellosolve, ethyl cellosolve, butyl cellosolve, propylene glycol monomethyl ether, propylene glycol monoethyl ether, propylene glycol propyl ether, diglyme, triglyme, tetraglyme, dipropylene glycol dimethyl ether, butyl carbitol, butyltriethylene glycol, methyldipropylene glycol, methyl cellosolve acetate, propylene glycol monomethyl ether acetate, dipropylene glycol butyl ether acetate, and diethylene glycol monobutyl ether acetate; ether-based solvents such as diethyl ether, dipropyl ether, methylcyclopropyl ether, tetrahydrofuran, dioxane, and anisole; ketone-based solvents such as methyl ethyl ketone, diethyl ketone, methyl isobutyl ketone, cyclohexanone, isophorone, and acetophenone; ester-based solvents such as methyl acetate, ethyl acetate, butyl acetate, propyl acetate, methyl butyrate, ethyl butyrate, caprolactone, methyl lactate, ethyl lactate, dimethyl succinate, dimethyl adipate, and dimethyl glutarate; halogenated solvents such as chloroform and dichloroethane; amide-based solvents such as dimethylformamide, dimethylacetamide, pyrrolidone, N-methylpyrrolidone, and caprolactam; and besides, dimethyl sulfoxide, sulfolane, tetramethylurea, ethylene carbonate, propylene carbonate, dimethyl carbonate, and so on. In addition, these organic solvents can be used alone or in combination of two or more. However, as the solvent to be used in the case of the previously described polymerization and reaction with the method II of the present invention, the solvent is required not to be a solvent having a functional group that can be reacted with an isocyanate group or an epoxy group.

Moreover, the organic solvent that has been used for polymerization can be used, as it is, as a constituent component of the pigment dispersion liquid, and the polymer is taken out from the solution to form a solid state as necessary. The method of forming the solid state is not particularly limited, and, for example, a solid body of the polymer is obtained taking out only the polymer by precipitating the polymer in a poor solvent and then filtering and drying, or by drying the solution. The obtained polymer solution may be used as it is in the pigment dispersion liquid of the present invention, or, when the polymer is taken out as a solid, the polymer can be used by dissolving the liquid medium to be used for the pigment dispersion liquid of the present invention.

In the case of conducting the solution polymerization, it is preferable that the solid concentration (monomer concentration) of the polymerization liquid is set to from 5 to 80 mass %, more preferably from 20 to 60 mass %. When the solid concentration of the polymerization liquid is less than 5 mass %, it sometimes occurs that the monomer concentration is too small and the polymerization is not completed. On the other hand, when the solid concentration of the polymerization liquid exceeds 80 mass % or when the polymerization is bulk polymerization, the viscosity of the polymerization liquid is too high and it becomes difficult to stir the polymerization liquid, and therefore the polymerization yield tends to be lowered. It is preferable to conduct the living radical polymerization until monomers disappears. Specifically, it is preferable to set the polymerization time from 0.5 to 48 hours, more preferably from 1 to 24 hours substantially. Moreover, the polymerization atmosphere is not particularly limited and may be the atmosphere in which oxygen is present within a usual range or may be the atmosphere which is under nitrogen gas stream. Moreover, materials (such as monomers) which are used for the polymerization may be the materials from which impurities are removed by distillation and active carbon treatment, alumina treatment, or the like, or commercially available materials may be used as supplied. Furthermore, the polymerization may be conducted under a light-shielded condition or in a transparent container such as a glass container.

As described previously, the graft copolymer that characterizes the present invention is a graft copolymer in which the molecular weight of the main chain is controlled by adjusting the use balance of the methacrylate-based monomers and the polymerization-initiating compound in conducting the living radical polymerization in terms of a molar ratio. Specifically, a polymer in which the main chain has any molecular weight can be obtained by appropriately setting the number of moles of the monomers relative to the number of moles of the polymerization-initiating compound. For example, when the polymerization is conducted using 1 mol of a polymerization-initiating compound and 500 mol of a monomer having a molecular weight of 100, a polymer having a theoretical molecular weight of "1×100× 500=50000". That is to say, the theoretical molecular weight of the polymer of the main chain can be calculated by the following formula (1). In addition, the concept of the above-described "molecular weight" includes both of the number average molecular weight (Mn) and the weight average molecular weight (Mw).

"Theoretical molecular weight of polymer of main chain"="1 mol of polymerization-initiating compound"×"molecular weight of monomer"× "number of moles of monomer/number of moles of polymerization-initiating compound" (1)

The amount of the polymerization-initiating compound is as described previously.

In addition, the polymerization step is sometimes accompanied by a side reaction such as bimolecular termination or disproportionation, and therefore it sometimes occurs that the polymer of the main chain having the above-described theoretical molecular weight is not obtained, however in the present invention, it is preferable that the polymer of the main chain is a polymer obtained through living radical polymerization during which the side reaction does not occur. Moreover, the conversion may not necessarily be 100%. Furthermore, the polymerization may be completed by adding the polymerization-initiating compound or catalyst to consume the residual monomers after the polymerization is once ended. That is to say, the pigment dispersant of the present invention may contain, as a main component, a graft copolymer having the above-described structure with a particular main chain produced by the production method as mentioned previously. Preferably when 80% or more of the produced copolymer is the graft copolymer having the structure with a particular main chain, it can be said that the effect can sufficiently be obtained and the obtained graft copolymer is a main component.

The graft copolymer that is obtained by the previously described method I or II may be the graft copolymer as it is in which an iodine atom that is originated from the polymerization-initiating compound is bonded, however it is preferable to detach the iodine. The method for detaching the iodine from the polymer is not particularly limited as long as the method is a conventionally known method. Specifically, the polymer may be heated or the polymer may be treated with an acid or an alkali. Moreover, the polymer may also be treated with sodium thiosulfate. The detached iodine may be removed by treating with an iodine-adsorbing agent such as activated carbon or alumina. The graft copolymer that is a main component of the pigment dispersant of the present invention can be obtained by the polymerization method as described above. The pigment dispersant of the present invention can be used for paints, inks, stationery, coating agents, and so on, and is particularly suitable for pigment dispersion liquids: which are used for inkjet inks, ultraviolet curable type inks, coloring agents for color filters; and for which fine dispersibility, stability, ejection performance, precipitation prevention performance, and recovering performance against precipitation are required.

<Pigment Dispersion Liquid and Pigment Dispersion Liquid Composition>

The pigment dispersion liquid obtained by using the pigment dispersant of the present invention having the above-described characteristics and the pigment dispersion liquid composition containing the pigment dispersion liquid as a constituent component are described. The pigment dispersion liquid is characterized in that the pigment dispersant and the pigment are dispersed in any one or more liquid media selected from among water, an organic solvent, and a polymerizable compound. As the pigment that is used in preparing the pigment dispersion liquid, organic pigments, inorganic pigments, metal-based pigments such as a metal powder or fine particles of a metal, inorganic fillers, and so on can be used, and the pigments are not particularly limited. Specific examples of the organic pigment and the inorganic pigment include red, green, blue, yellow, orange, violet, black, and white pigments selected from the group consisting of quinacridone-based pigments, anthraquinone-based pigments, diketo-pyrrolo-pyrrole pigments, perylene-based pigments, phthalocyanine blue-based pigments, phthalocyanine green-based pigments, isoindolinone-based pigments, indigo/thioindigo pigments, dioxazine-based pigments, quinophthalone pigments, nickel azo pigments, insoluble azo-based pigments, soluble azo-based pigments, high molecular weight azo-based pigments, carbon black pigments, complex oxide-based black pigments, iron oxide black pigments, titanium oxide-based black pigments, azomethine-azo-based black pigments, and titanium oxide-based pigments. Specific examples of the metal-based pigment include a copper powder, an aluminum flake, and so on. Moreover, specific examples of the inorganic filler include, but not particularly limited to, mica-based pigments, natural minerals, silica, and so on.

Among these pigments, in the present invention, a pigment having a molecular structure or a modified surface which contains a group that forms an ion bond or a hydrogen bond with an acidic group (such as a carboxylic group) or a basic group (such as an amino group) which is bonded to the main chain of the pigment dispersant of the present invention is preferable. Specifically, the preferable pigments include pigments having a strong hydrogen bonding property, such as acidic carbon, basic carbon, soluble azo pigments, diketo-pyrrolo-pyrroles, and quinacridones.

Specifically, the pigments that is used in inkjet inks are Color Index Number (C.I.) Pigment Blue 15:3 and 15:4, C.I. Pigment Red 122 and 269, C.I. Pigment Violet 19, C.I. Pigment Yellow 74, 155, 180, and 183, C.I. Pigment Green 7, 36, and 58, C.I. Pigment Orange 43, C.I. Pigment Black 7, and C.I. Pigment White 6. The average primary particle diameter thereof is less than 350 nm. C.I. Pigment Blue 15:3 and 15:4, C.I. Pigment Red 122 and 269, C.I. Pigment Violet 19, C.I. Pigment Yellow 74, 155, 180, and 183, C.I. Pigment Green 7, 36, and 58, and C.I. Pigment Orange 43 are more preferable. Regarding C.I. Pigment Black 7, it is favorable that the average particle diameter is less than 150 nm, and regarding C.I. Pigment White 6, it is favorable that the average particle diameter is less than 300 nm. It is favorable that the particle diameter is small from the standpoint of clogging of nozzles or sharpness of images. Treated pigments to which surface treatment or encapsulation is applied with a resin or a surface treatment agent such as a coupling agent or a surface active agent may be used.

Moreover, it is preferable to use an inorganic pigments for black matrixes or an organic pigment as a pigment for color filters. Red pigments include C.I. Pigment Red (PR) 56, 58, 122, 166, 168, 176, 177, 178, 224, 242, 254, and 255. Green pigments include C.I. Pigment Green (PG) 7, 36, and 58, poly(14 to 16)bromo copper phthalocyanines, and poly(12 to 15)brominated-poly(4 to 1)chlorinated copper phthalocyanines. Blue pigments include C.I. Pigment Blue 15:1, 15:3, 15:6, 60, 80, and so on.

Moreover, complementary pigments to the above-described pigments for color filters or pigments for multi-color type pixels include the following pigments. Yellow pigments include C.I. Pigment Yellow (PY) 12, 13, 14, 17, 24, 55, 60, 74, 83, 90, 93, 126, 128, 138, 139, 150, 154, 155, 180, 185, 216, and 219, and C.I. Pigment Violet (PV) 19 and 23. Moreover, black pigments for black matrixes include C.I. Pigment Black (PBk) 6, 7, 11, and 26, and copper/manganese/iron-based complex oxides, and so on.

The number average particle diameter of the pigments after dispersion is, but not particularly limited to, from 10 to 200 nm for carbon black and organic pigments, preferably from 20 to 150 nm. The number average particle diameter of inorganic pigments such as titanium oxide after dispersion is from 50 to 300 nm for inorganic pigments such as titanium oxide, more preferably from 100 to 250 nm. In addition, the average particle diameter of the pigments can be determined by observation with a transmission electron microscope (TEM). The pigment dispersion liquid of the present invention obtained by dispersing the pigment thus micronized with the pigment dispersant of the present invention is a coloring agent imparting high color developing properties, high image quality, high gloss, and high printability.

The pigment dispersant of the present invention is obtained by dispersing the pigment dispersant of the present invention and the pigment in a liquid medium. As the liquid medium, any one or more liquid media among water, an organic solvent, and a polymerizable compound can be used, and the liquid media may appropriately selected according to the intended use that is a target of the pigment dispersion liquid composition (product) to which the pigment dispersion liquid is applied. The pigment dispersion liquid in which water as a liquid medium is contained as a main component of the liquid media becomes an aqueous pigment dispersion liquid composition, the pigment dispersion liquid in which an organic solvent is contained as a main component of the liquid media becomes an oil-based pigment dispersion liquid composition, and the pigment dispersion liquid in which a polymerizable compound is contained as a main component of the liquid media becomes a ultraviolet ray curable or electron beam curable pigment dispersion liquid composition. The pigment dispersion liquid compositions (products) include paints, inks, coating agents, and so on. As specific liquid media that can be used, water and the previously described organic solvents can be used, and in the case of the polymerizable compounds, monomers and oligomers that are radically polymerizable compounds or cationically polymerizable compounds as listed below can be used.

As the radically polymerizable compounds that can be used for the pigment dispersion liquid compositions, specifically, acrylic acid-based monomers and oligomers are suitable. Specific examples of the monomer include butyl acrylate, 2-methylpropane acrylate, t-butyl acrylate, pentyl acrylate, hexyl acrylate, octyl acrylate, 2-ethylhexyl acrylate, nonyl acrylate, decyl acrylate, isodecyl acrylate, lauryl acrylate, tetradecyl acrylate, octadecyl acrylate, behenyl acrylate, isostearyl acrylate, cyclohexyl acrylate, t-butylcyclohexyl acrylate, isobornyl acrylate, trimethylcyclohexyl acrylate, cyclodecyl acrylate, cyclodecylmethyl acrylate, tricyclodecyl acrylate, benzyl acrylate, phenoxyethyl acrylate, phenyl acrylate, naphthyl acrylate, 2-hydroxyethyl acrylate, 2-hydroxypropyl acrylate, (poly)ethylene glycol monomethyl ether acrylate, (poly)ethylene glycol monolauryl ether acrylate, (poly)propylene glycol monomethyl ether acrylate, octafluorooctyl acrylate, tetrafluoroethyl acrylate, acrylates of ethylene oxide adducts of nonylphenyl ether, acryloyloxyethyl phosphate, acryloyloxy phthalic acid, and so on. Moreover, the previously described methacrylate-based monomers can also be used.

Moreover, the radically polymerizable oligomer is a compound having two or more polymerizable groups in one molecule, and the specific examples thereof include: esterified compounds of a diacrylic acid with an alkyl, alkenyl, or cycloalkyl diol such as ethylene glycol, butanediol, hexanediol, nonanediol, cyclohexanedimethanol, butenediol, butynediol, and neopentyl glycol; esterified compounds of a diacrylic acid with a poly(n=2 or more) glycol ether such as an ethylene oxide adduct of polyethylene glycol, polypropylene glycol, polytetramethylene glycol, bisphenol A, or the like; diacrylated compounds of polyester diols such as poly(hexanediol adipate), polybutanediol succinic acid, and polycaprolactone; diacrylates of carbonate diols such as poly(hexamethylene carbonate); polyacrylated compounds of urethane polyols obtained from a diisocyanate such as toluene diisocyanate and a diol, triol, or diamine; polyacrylated compounds of epoxy resins such as glycidyl ether adducts of bisphenol A; and polyacrylated compounds of polyhydric compounds such as polyglycerin, trimethylolpropane, pentaerythritol, dipentaerythritol, and sorbitol, and alkylene oxide adducts thereof; and so on.

As the cationically polymerizable compound, compounds having a cationically polymerizable property among the previously described acrylates and radically polymerizable oligomers can also be used, and vinyl ether-based compounds can be used. As the specific examples of the vinyl ether-based compounds, monofunctional vinyl ethers such as ethyl vinyl ether, butyl vinyl ether, cyclohexyl vinyl ether, and hydroxyethyl vinyl ether; and multifunctional vinyl ethers such as (poly)ethylene glycol divinyl ether, butane diol divinyl ether, hexane diol divinyl ether, trimethylol propane trivinyl ether; and so on can be used. Furthermore, epoxy compounds and oxetane compounds can also be used.

The pigment dispersion liquid of the present invention can be obtained by dispersing the pigment dispersant of the present invention and a pigment in a liquid medium, however, it is preferable for the purpose of making the dispersibility of the pigment with the pigment dispersant more favorable that a dye derivative which forms an ion bond with a functional group in the main chain of the pigment dispersant of the present invention is added or the surface of the pigment is treated with the dye derivative in order to allow the pigment dispersant to be adsorbed on the surface of the pigment by positively facilitating the formation of the ion bond. Specifically, when the pigment dispersant having an acidic group in the main chain of the pigment dispersant is used, it is preferable to use a dye derivative having a basic group, and when the pigment dispersant having a basic group in the main chain of the pigment dispersant is used, it is preferable to use a dye derivative having an acidic group. In addition, the dye derivative is a compound: which has the same structure as the structure of the pigment; which has a similar structure to the structure of the pigment; and which is the same as or similar to the raw material that forms the pigment, and the examples of the skeleton of the pigment dispersant include azo-based dye skeletons, phthalocyanine-based dye skeletons, anthraquinone-based dye skeletons, triazine-based dye skeletons, acridine-based dye skeletons, perylene-based dye skeletons, and so on, and the dye skeleton having one or more functional groups bonded to a part or parts of the structure thereof. The functional groups may directly be bonded to the dye skeleton, but may be bonded to the dye skeleton through a hydrocarbon group such as an alkyl group or an aryl group; or through an ester, ether, sulfonamide, or urethane bond.

The dye derivatives having a basic group include dye derivatives having a functional group in which the basic group is an amino group. The dye derivatives having an acidic group include dye derivatives having an acidic group in which the acidic group is a carboxyl group, a phosphate group, or a sulfonated group. Among the acidic groups, the sulfonated group is preferable because of the strength of the acidity. The dye derivative, when added during synthesis, crystallization, or micronization of the pigment, can make the surface of the pigment rich in functional groups by being adsorbed on the surface of the pigment due to the same structure as or the similar structure to the pigment. Moreover, the amount of the dye derivative is preferably from 3 to 50% based on the amount of the pigment, more preferably from 5 to 30%. Regarding the dye derivatives, any of conventionally known compounds, surface treatment methods or the addition amounts may be adopted, and the compound, surface treatment method, and the addition amount are not particularly limited.

As described above, the pigment dispersion liquid of the present invention is made by adding the pigment dispersant of the present invention, the pigment, the liquid medium, and, as necessary, the dye derivative. The concentration of the pigment is not limited. For example, the pigment concentration is from 30 to 70 mass % in the case of inorganic pigments, and from 10 to 30 mass % in the case of organic pigments, although it is difficult to say definitely because the pigment concentration is different depending on whether the pigment is an organic pigment or an inorganic pigment or depending on the intended use. Moreover, the amount of the pigment dispersant of the present invention based on the amount of the pigment is not particularly limited because the specific surface area changes depending on the particle size, but is preferably from 3 to 100 mass % based on the amount of the pigment, more preferably from 5 to 80 mass %, further more preferably from 5 to 50 mass %, and, in this way, dispersion is possible in a small amount of the pigment dispersant.

Besides, another additive as listed below may be used in the pigment dispersion liquid of the present invention or the pigment dispersion liquid composition using the pigment dispersion liquid. One or more of various kinds of additives such as, for example, a defoaming agent, a leveling agent, a light stabilizing agent, an ultraviolet ray-absorbing agent, a surface adjusting agent, a coloring agent such as a dye, a polymer component for assisting dispersion stability or improving film properties, a water repellent agent, an oil repellent agent, a crosslinking agent accompanied by chemical bonds, a matting agent, a silane coupling agent, a surface active agent, a photopolymerization initiator, a photosensitizer, a co-sensitizer, a polymerization inhibitor, and anti-oxidant can be added optionally, and the kind of the additive is not particularly limited.

Next, any dispersion method can be chosen as a method for obtaining the pigment dispersion liquid of the present invention, and the method is not particularly limited. Examples of the disperser that is used include kneading machines such as a kneader, a two-roll, three-roll, and Miracle KCK (manufactured by Asada Iron Works Co., Ltd.); ultrasonic dispersers; and high pressure homogenizers such as Microfluidizer (manufactured by Mizuho Industrial Co., Ltd.), Nanomizer (manufactured by Yoshida Kikai Co., Ltd.), Starburst (manufactured by Sugino Machine Ltd.), and G-smasher (manufactured by RIX Corporation). Moreover, among the dispersers using beads media such as glass and zircon, a ball mill, a sand mill, and a horizontal media mill disperser, and a colloid mill can be used. The dispersion formulation is not particularly limited.

For the purpose of obtaining a pigment dispersion having intended particle size and distribution, a method in which the size of a medium for pulverization of the disperser is made small, the filling ratio of a medium for pulverization is made large, the treatment time is made long, ejection speed is made slow, classification of particles is conducted with a filter or a centrifugal separator after pulverization, or the like can be used in the present invention. Or, the method includes a combination of thereof. Next, the obtained pigment dispersion liquid may be used as it is, however it is preferable that coarse particles are removed with a centrifugal separator or through an optional filter. The pigment dispersion liquid of the present invention can be obtained in the manner as described above.

The physical property of the obtained pigment dispersion liquid of the present invention, such as viscosity, is not particularly limited and is optional. The range of the viscosity includes from 1 to 100 mPa·s, preferably from 3 to 50 mPa·s, however the range of the viscosity is different depending on the desired pigment concentration and the intended use and therefore is not limited at all. The other physical properties are also not particularly limited.

The pigment dispersion liquid of the present invention can be used as a coloring agent for various articles. For example, the pigment dispersion liquid of the present invention can be used as a pigment coloring agent composition for paints, gravure inks, offset inks, inkjet inks, coating agents, a color for stationery, and so on. The pigment dispersion liquid of the present invention makes it possible to reduce the viscosity of dispersion liquids and achieve high degree of micronization of pigments, furthermore the long term storage stability of the pigment dispersion liquid of the present invention is favorable, and therefore the dispersion liquid of the present invention is particularly suitable as a coloring agent for color filters or a coloring agent for inkjet inks.

EXAMPLES

Next, the present invention will be described in more detail giving Synthesis Examples, Examples, and Comparative Examples. Hereinafter, "parts" and "%" in the present specification are based on mass unless otherwise noticed. In addition, the present invention is not limited to the Examples. The molecular weight of each compound is represented by Mw.

Synthesis Example 1: Acidic Pigment Dispersant-1

Respective materials described below were charged in a 1 L separable flask equipped with a reflux tube, a gas-introducing apparatus, a thermometer, and a stirring apparatus, living radical polymerization was conducted under the presence of iodine as a polymerization-initiating compound in a manner as described below to obtain a graft copolymer specified in the present invention, and the graft copolymer was designated as acidic pigment dispersant-1. The production method falls within the previously described method I.

As a solvent, 426.8 parts of propylene glycol monomethyl ether acetate (hereinafter, written as PGMAc) was used, 3.1 parts (0.0122 mol) of iodine ($I_2$: Mw=253.8) was used as a polymerization-initiating compound, and 14.8 parts (0.0480 mol) of 2,2'-azobis(4-methoxy-2,4-dimethyl valeronitrile) (Mw=308.42) (manufactured by Wako Pure Chemical Industries, Ltd., hereinafter, written as V-70) was used as a polymerization initiator capable of generating radicals. In the living radical polymerization of the present invention, one iodine atom becomes a polymerization-initiating compound, and therefore the use amount of the polymerization-initiating compound in the present Synthesis Example is 0.0122×2=0.0244 mol.

The living radical polymerization through which the following methacrylate (A) having an acidic group, methacrylate-based macromonomer (B), and another methacrylate each charged in the reaction system were subjected to a propagation reaction was conducted with the polymerization-initiating compound and a catalyst. As the catalyst, 0.5 parts of diphenylmethane (hereinafter, written as DPM) was used. As monomers charged in the present Synthesis Example, 33.3 parts (0.189 mol) of benzyl methacrylate (Mw=176.21) (hereinafter, written as BzMA), 83.5 parts (0.300 mol) of 2-methacryloyloxyethyl phthalate (hereinafter, written as PA) (Mw=278.26) as a methacrylate (A), and 175 parts (0.299 mol) of polypropylene glycol monomethyl ether methacrylate (terminal of polypropylene glycol monomethyl ether having a molecular weight of 500 is methacrylate residue, hereinafter, written as PP 500) (Mw=585) as a methacrylate-based macromonomer (B)

were used. Accordingly, the ratio of the total number of moles of the methacrylate-based monomers to 1 mol of the polymerization-initiating compound is 32.3/1.

The initiation reaction and the propagation reaction occurring subsequently after the initiation reaction in the living radical polymerization were conducted in a manner as described below. First of all, polymerization was conducted at 40° C. for 9 hours while blowing nitrogen. The brown color at the time of dissolving iodine disappeared in 2 hours and turned to light lemon color. At that point, a polymerization-initiating compound in which iodine was bonded to the terminal of the initiator produced by cleavage of V-70 was produced. Next, as the polymerization was allowed to proceed to conduct the propagation reaction, the reaction solution gradually became viscous. At 9 hours after the brown color of iodine disappeared, part of the reaction solution was sampled and measured by a gel permeation chromatograph (THF eluent, in terms of polystyrene, hereinafter, abbreviated as GPC) to find that Mn was 12400, PDI was 1.23, and the molecular weight at the peak top was 15100. It was confirmed by the measurement results that a polymer showing a narrow molecular weight distribution had been formed through the polymerization reaction. Moreover, a monomer derived from raw materials, particularly a macromonomer is liable to be left unreacted in the usual polymerization reaction of a resin, however those peaks originated from the monomer and macromonomer were not observed at all.

Moreover, the solid content after the sampled product at that time was dried at 150° C. for 1 hour was 40.3%, and thereby it was confirmed that the polymerization had been almost completed. In addition, any of solid contents shown below is a value obtained by conducting measurement in the same manner under the same dry condition as described above. Moreover, the acid value of the sampled product at that time, when determined after the sampled product was diluted with toluene and ethanol by acid-base titration with a 0.1% potassium hydroxide ethanolic solution using a phenolphthalein solution as an indicator, was 56.4 mgKOH/g. In addition, any of the acid values shown below is a value calculated after the same operation as the above-described operation was applied.

Thereafter, nitrogen blowing was stopped, then the temperature was raised to 90° C. while blowing air instead of nitrogen and was kept at 90° C. for 30 minutes, and the color of the solution was changed from light lemon color to brown color again. This is because iodine at the terminal was detached and an iodine molecule was produced again. Next, the reaction solution was transferred to a 2 L beaker in order to remove the iodine molecule, 247.3 parts of PGMAc was added so that the solid content became 30%, and the resultant mixture was stirred until the mixture became uniform. As activated carbon, 50 g of SHIRASAGI M (manufactured by Japan EnviroChemicals, Inc.) was added to adsorb iodine under stirring at room temperature for 12 hours, and thereafter the activated carbon was removed by filtration with a filter to obtain a yellow transparent liquid. The solid content of the liquid was measured to be 30.2%. Measurement of the molecular weight by GPC measurement, measurement by an infrared spectrophotometer (hereinafter, written as IR), and measurement of the acid value of the polymer in the obtained resin solution were conducted, however changes were hardly observed in any measurement, and thereby it was confirmed that the polymer was not removed by the activated carbon. In addition, the similar confirmation was conducted in other Synthesis Examples. The resin solution was designated as acidic pigment dispersant-1, and the acidic pigment dispersant-1 falls within an example of the present invention.

Synthesis Example 2: Acidic Pigment Dispersant-2

A pigment dispersant specified in the present invention was obtained through living radical polymerization using the same apparatus as in Synthesis Example 1 by the method I in the same manner as in Synthesis Example 1. In the present Synthesis Example, 401 parts of diethylene glycol monobutyl ether (hereinafter, written as BDG) as a solvent, 3.1 parts (0.0122 mol) of iodine, 14.8 parts of V-70, 47.4 parts (0.269 mol) of BzMA, 18.0 parts (0.0857 mol) of 2-(methacryloyloxy)ethyl phosphate (product name P1M, manufactured by Kyoeisha Chemical Co., Ltd., hereinafter, written as PIM) (Mw=210.12) as a methacrylate (A) having an acidic group, 214.2 parts (0.197 mol) of polyethylene glycol monomethyl ether methacrylate (terminal of polyethylene glycol monomethyl ether having a molecular weight of 1000 is methacrylate residue, hereinafter, written as PME1000) (Mw=1085) as a methacryl-based macromonomer (B), and 0.5 parts of DPM were charged. Next, polymerization was conducted at 40° C. for 9 hours while blowing nitrogen. In the above-described polymerization, the ratio of the total number of moles of the methacrylate-based monomers to 1 mol of the polymerization-initiating compound is 22.6/1.

After 9 hours of polymerization, part of the reaction solution was sampled, then the molecular weight was measured by GPC measurement to find that Mn was 8500, PDI was 1.30, the molecular weight at the peak top was 11100, and a peak originated from the raw materials, particularly a peak originated from the macromonomer was not observed. The solid content of the sampled product was measured to be 40.5%, and thereby it was confirmed that the polymerization had been almost completed. Moreover, the acid value of the sampled product was 22.2 mgKOH/g.

Thereafter, nitrogen blowing was stopped, then the temperature was raised to 90° C. while blowing air instead of nitrogen and was kept at 90° C. for 30 minutes to detach the terminal iodine. Next, the reaction solution was transferred to a 2 L beaker, 233 parts of BDG was added so that the solid content became 30%, and the resultant mixture was stirred until the mixture became uniform. As activated carbon, 50 g of SHIRASAGI M was added to adsorb iodine to the activated carbon under stirring at room temperature for 12 hours, and thereafter the activated carbon was removed by filtration with a filter to obtain a yellow transparent liquid. The solid content of the obtained liquid was measured to be 30.4%. The resin solution was designated as acidic pigment dispersant-2, and the acidic pigment dispersant-2 falls within an example of the present invention.

Synthesis Example 3: Acidic Pigment Dispersant-3

Acidic pigment dispersant-3 was synthesized by the method I using the same apparatus as in Synthesis Example 1. In the present Synthesis Example, first of all, a macromonomer in which a methacrylate residue is bonded to a terminal of a glycol chain through a urea bond was obtained in a manner as described below. As a solvent, 57 parts of PGMAc, and 11.6 parts (0.0748 mol) of isocyanate ethyl methacrylate (Mw=155.15) (product name: Karenz MOI, manufactured by Showa Denko K.K., hereinafter, written as MOI) were charged and stirred. Next, a mixed solution of 150 parts of poly (ethylene glycol/propylene glycol) random polymer monomethyl ether having a single terminal amino group and having a molecular weight of 2000 (product name: Jeffamine M-2005, manufactured by Huntsman International LLC., hereinafter, written as M2005) and 150 parts of PGMAc was added. Heat generation to a certain extent was observed. After 30 minutes of stirring, disappearance of absorption of isocyanate and generation of a urea bond were checked by IR to confirm that all the isocyanate groups had been reacted. Accordingly, the product is a methacrylate-based macromonomer (B) in which a methacrylate residue is bonded to a terminal of a glycol chain through a urea bond. In the present Synthesis Example, the macromonomer was used as a raw material, and the use amount thereof is 0.0748 mol.

Next, 41.7 parts (0.150 mol) of PA and 7.5 parts (0.075 mol) of methyl methacrylate (hereinafter, written as MMA) (Mw=100.1) were charged as methacrylates (A) in the above-described macromonomer, then the resultant mixture was homogenized, and 1.5 parts (0.00591 mol) of iodine, 7.4 parts of V-70, and 0.3 parts of DPM were further charged. Next, polymerization was conducted at 40° C. for 9 hours while blowing nitrogen. The use amount of the polymerization-initiating compound in the present Synthesis Example becomes 0.00591×2=0.0118 mol. In the above-described polymerization, the ratio of the total number of moles of the methacrylate-based monomers to 1 mol of the polymerization-initiating compound is 25.4/1.

After 9 hours of polymerization, part of the reaction solution was sampled, then the molecular weight was measured by GPC measurement to find that Mn was 17500, PDI was 1.50, the molecular weight at the peak top was 26100, and a peak originated from the raw materials, particularly a peak originated from the macromonomer was not observed. As a result of the solid content measurement, the conversion was almost 100%. The acid value was 39.8 mgKOH/g. Thereafter, nitrogen blowing was stopped, then the temperature was raised to 90° C. while blowing air instead of nitrogen and was kept at 90° C. for 30 minutes to detach the terminal iodine. Next, the reaction solution was transferred to a 2 L beaker, 175.7 parts of PGMAc was added so that the solid content became 30%, and the resultant mixture was stirred until the mixture became uniform. As activated carbon, 25 g of SHIRASAGI M was added to adsorb iodine under stirring at room temperature for 12 hours, and thereafter the activated carbon was removed by filtration with a filter to obtain a yellow transparent liquid. The solid content of the obtained liquid was measured to be 30.7%. The resin solution was designated as acidic pigment dispersant-3, and the acidic pigment dispersant-3 falls within an example of the present invention.

Synthesis Example 4: Acidic Pigment Dispersant-4

Acidic pigment dispersant-4 was synthesized by the method I using the same apparatus as in Example 1. Charged were 402.1 parts of PGMAc, 1.5 parts (0.00591 mol) of iodine, 7.4 parts of V-70, 7.5 parts (0.075 mol) of MMA, 41.7 parts (0.150 mol) of PA, 225 parts (0.075 mol) of a macromonomer of poly ε-caprolactone monomethacrylate (poly ε-caprolactone having a methacrylate at a terminal thereof and being obtained through ring-opening polymerization of ε-caprolactone using 2-hydroxyethyl methacrylate as an initiator, flaky, average degree of polymerization 26.3, hereinafter, written as CLMA) having a molecular weight of 3000 as a methacrylate-based macromonomer (B), and 0.3 parts of DPM. Next, polymerization was conducted at 40° C. for 9 hours while blowing nitrogen. In the above-described polymerization, the ratio of the total number of moles of the methacrylate-based monomers to 1 mol of the polymerization-initiating compound is 25.4/1.

After 9 hours of polymerization, part of the reaction solution was sampled, then the molecular weight was measured by GPC measurement to find that Mn was 22600, PDI was 1.45, and the molecular weight at the peak top was 32000, and a peak originated from the raw materials, particularly a peak originated from the macromonomer was not observed. The solid content was measured to be 40.9%, and thereby it was confirmed that the polymerization had been almost completed. The acid value was 30.7 mgKOH/g. Thereafter, nitrogen blowing was stopped, then the temperature was raised to 90° C. while blowing air instead of nitrogen and was kept at 90° C. for 30 minutes to detach the terminal iodine. Next, the reaction solution was transferred to a 2 L beaker, 228.5 parts of PGMAc was added so that the solid content became 30%, and the resultant mixture was stirred until the mixture became uniform. As activated carbon, 50 g of SHIRASAGI M was added to adsorb iodine under stirring at room temperature for 12 hours, and thereafter the activated carbon was removed by filtration with a filter to obtain a yellow transparent liquid. The solid content of the obtained liquid was measured to be 30.3%. The resin solution was designated as acidic pigment dispersant-4, and the acidic pigment dispersant-4 falls within an example of the present invention.

Synthesis Example 5: Acidic Pigment Dispersant-5

Acidic pigment dispersant-5 was synthesized by the method I using the same apparatus as in Synthesis Example 1. In the present Synthesis Example, first of all, a macromonomer in which a methacrylate residue is bonded to a terminal of a glycol chain through a urea bond was obtained in a manner as described below. As a solvent, 64 parts of a dibasic acid diester (product name: DBE, manufactured by Invista, hereinafter, written as DBE), and 11.6 parts (0.0748 mol) of MOI were charged and stirred. Next, a mixed solution of 150 parts of M2005 and 200 parts of DBE was added, and the resultant mixture was stirred at room temperature for 30 minutes. It was confirmed by IR that the reaction of the isocyanate group had been completed. In the present Synthesis Example, the macromonomer was used as a raw material, and therefore the use amount of the methacrylate-based macromonomer (B) used in the present Synthesis Example is 0.0748 mol. Next, 12.9 parts (0.150 mol) of methacrylic acid (hereinafter, written as MAA) and 7.5 parts (0.075 mol) of MMA were charged as methacrylates (A) in the macromonomer, then the resultant mixture was homogenized, and 1.5 parts (0.00591 mol) of iodine, 7.4 parts of V-70, and 0.3 parts of DPM were further charged. Next, polymerization was conducted at 40° C. for 9 hours while blowing nitrogen. In the above-described polymerization, the ratio of the total number of moles of the methacrylate-based monomers to 1 mol of the polymerization-initiating compound is 25.4/1.

After 9 hours of polymerization, part of the reaction solution was sampled, then the molecular weight was measured by GPC measurement to find that Mn was 14900, PDI was 1.32, the molecular weight at the peak top was 19600, and a peak originated from the raw materials, particularly a peak originated from the macromonomer was not observed. As a result of the solid content measurement, the conversion was almost 100%. The acid value was 45.5 mgKOH/g. Thereafter, nitrogen blowing was stopped, then the temperature was raised to 90° C. while blowing air instead of nitrogen and was kept at 90° C. for 30 minutes to detach the terminal iodine. Furthermore, the reaction solution was transferred to a 2 L beaker, 151.7 parts of DBE was added to dilute the solution so that the solid content became 30%, and thereafter the resultant mixture was stirred until the mixture became uniform. As activated carbon, 25 g of SHIRASAGI M was added to adsorb iodine under stirring at room temperature for 12 hours, and thereafter the activated carbon was removed by filtration with a filter to obtain a yellow transparent liquid. The solid content of the obtained liquid was 30.0%. The resin solution was designated as acidic pigment dispersant-5, and the acidic pigment dispersant-5 falls within an example of the present invention.

Comparative Synthesis Example 1: Comparative Pigment Dispersant-1

A polymer was synthesized using the same apparatus as in Example 1 in a manner as described below. First of all, 57 parts of PGMAc, 11.6 parts of MOI were charged and stirred. Next, a mixed solution of 150 parts of M2005 and 150 parts of PGMAc was added, and the resultant mixture was stirred under room temperature for 30 minutes. It was confirmed by IR that the reaction of the isocyanate group had been completed. By the above-described reaction, a methacrylate-based macromonomer similar to the methacrylate-based macromonomer used in Synthesis Example 3 was synthesized. Next, the macromonomer was used as a raw material, 41.7 parts of PA and 7.5 parts of MMA were charged, then the resultant mixture was homogenized, 10 parts of V-70 as a polymerization initiator was further charged, and polymerization was conducted while heating the reaction mixture at 40° C. The obtained polymer has the same monomer composition as in Synthesis Example 3, but is a random copolymer obtained through usual radical polymerization. However, the reaction solution became viscous at 30 minutes after polymerization to immediately become gelled.

Part of the gelled product was sampled and was dissolved in THF to find that there was insoluble matter left undissolved. When the molecular weight of the matter which was soluble in THF was measured, a large amount of macromonomer as a raw material was detected. It is considered from the result that the bond between molecules due to a strong hydrogen bond which was originated from urea and the molecular weight of the main chain were not able to be controlled thereby making the molecular weight large and lowering the solubility and therefore the system became gelled. Moreover, it is considered that a large amount of macromonomer as a raw material was left unreacted because gelation had occurred before the polymerization was fully completed.

Accordingly, it has been able to be confirmed from the comparison of the previously described Synthesis Example 3 with Comparative Example 1 that the living radical polymerization which is utilized in the present invention is capable of controlling the structure of a resin to a high degree even though the structure has a multi-branched structure and therefore is greatly suitable for obtaining a resin structure which is necessary for making the pigment dispersant of the present invention capable of giving a remarkable effect.

The compositions and physical properties of respective polymers specified in the present invention and used for respective acidic pigment dispersants which were obtained by the above-described Synthesis Examples 1 to 5 and fall within examples of the present invention are shown together in Table 1.

TABLE 1

Compositions and Physical Properties of Polymers Obtained by Synthesis Examples 1 to 5

|  | Synthesis Example 1 | Synthesis Example 2 | Synthesis Example 3 | Synthesis Example 4 | Synthesis Example 5 |
| --- | --- | --- | --- | --- | --- |
| Acidic pigment dispersant | -1 | -2 | -3 | -4 | -5 |
| Synthesis method | Method I | Method I | Method I | Method I | Method I |
| Solvent | PGMAc | BDG | PGMAc | PGMAc | DBE |
| Composition of side chain | Polypropylene glycol | Polyethylene glycol | Polypropylene glycol/ polyethylene glycol | Poly-caprolactone | Polypropylene glycol/ polyethylene glycol |
| Monomer composition | BzMA/PA/ PP500 | BzMA/P1M/ PME1000 | MMA/PA/ MOI/M2005 | MMA/PA/ CLMA | MMA/MAA/ MOI/M2005 |
| Composition ratio (mass ratio) | 11.4/28.6/60.0 | 17.0/6/76.6 | 3.6/19.8/5.5/71.1 | 2.7/15.2/82.1 | 4.1/7.1/6.4/82.4 |
| Monomer/initiation compound (molar ratio) | 32.3/1 | 22.6/1 | 25.4/1 | 25.4/1 | 25.4/1 |
| Mn | 12400 | 8500 | 17500 | 22600 | 14900 |
| PDI | 1.23 | 1.30 | 1.50 | 1.45 | 1.32 |
| Acid value (mgKOH/g) | 56.4 | 22.2 | 39.8 | 30.7 | 45.5 |
| Solid content (%) | 30.2 | 30.4 | 30.7 | 30.3 | 30.0 |

Synthesis Example 6: Basic Pigment Dispersant-1

A pigment dispersant specified in the present invention was obtained by subjecting monomers together with a polymerization-initiating compound to living radical polymerization using the same apparatus as in Synthesis Example 1 by the method I in the same manner as in Synthesis Example 1. In the present Synthesis Example, a methacrylate having a basic group was used as a methacrylate (A). As a solvent, 443.8 parts of PGMAc, and 3.1 parts (0.0122 mol) of iodine, 14.8 parts of V-70, 47.1 parts (0.300 mol) of dimethylaminoethyl methacrylate (hereinafter, written as DMAEMA) (Mw=157.2) as a methacrylate (A) having a basic group, 21.0 parts (0.119 mol) of BzMA, 240 parts (0.271 mol) of polypropylene glycol monomethyl ether methacrylate (terminal of polypropylene glycol monomethyl ether having a molecular weight of 800 is methacrylate residue, hereinafter, written as PP800) (Mw=885) as a methacrylate-based macromonomer (B), and 0.5 parts of DPM were charged. Next, polymerization was conducted at 40° C. for 9 hours while blowing nitrogen. In the above-described polymerization, the ratio of the total number of moles of methacrylate-based monomers to 1 mol of the polymerization-initiating compound is 28.3/1.

After 9 hours of polymerization, part of the reaction solution was sampled, then the molecular weight was measured by GPC measurement to find that Mn was 12800, PDI was 1.33, the molecular weight at the peak top was 17000, a peak originated from the raw materials, particularly a peak originated from the macromonomer was not observed, and as a result of the solid content measurement, the conversion was almost 100%. Moreover, the amine value of the sampled product, when determined after the sampled product was diluted with toluene and 2-propanol by acid-base titration with a 0.1N hydrochloric acid 2-propanolic solution using a bromo cresol green solution as an indicator, was 54.6 mgKOH/g. The amine value was calculated by the same operation as the above-described operation in the other Synthesis Examples.

Thereafter, nitrogen blowing was stopped, then the temperature was raised to 90° C. while blowing air instead of nitrogen to detach the iodine bonded to the terminal of the polymer chain. Furthermore, the reaction solution was transferred to a 2 L beaker, 256.7 parts of PGMAc was added to dilute the solution so that the solid content became 30%, and thereafter 50 g of SHIRASAGI M was added as activated carbon to adsorb iodine under stirring at room temperature for 12 hours. Thereafter the activated carbon was removed by filtration with a filter to obtain a yellow transparent liquid. The solid content of the obtained liquid was 30.7%. The resin solution was designated as basic pigment dispersant-1, and the basic pigment dispersant-1 falls within an example of the present invention.

Synthesis Example 7: Basic Pigment Dispersant-2

Basic pigment dispersant-2 was synthesized by the method I using the same apparatus as in Synthesis Example 1. In the present Synthesis Example, first of all, a macromonomer in which a methacrylate residue is bonded to a terminal of a glycol chain through a urea bond was obtained in a manner as described below. As a solvent, 89.9 parts of PGMAc, and 11.6 parts (0.0748 mol) of MOI were charged and stirred. Next, a mixed solution of 150 parts (0.075 mol) of M2005 and 200 parts of PGMAc was added, and the resultant mixture was stirred at room temperature for 30 minutes. It was confirmed by IR that the reaction of the isocyanate group had been completed. Accordingly, the product is a methacrylate-based macromonomer (B) in which a methacrylate residue is bonded to a terminal of a glycol chain through a urea bond. The obtained macromonomer was used as a raw material, and therefore the use amount thereof is 0.0748 mol.

Next, 23.6 parts (0.150 mol) of DMAEMA and 7.5 parts (0.075 mol) of MMA were charged in the above-described macromonomer as a raw material, then the resultant mixture was homogenized, and 1.5 parts (0.00591 mol) of iodine, 7.4 parts of V-70, and 0.3 parts of DPM were further charged. Next, polymerization was conducted at 40° C. for 9 hours while blowing nitrogen. In the above-described polymerization, the ratio of the total number of moles of the methacrylate-based monomers to 1 mol of the polymerization-initiating compound is 25.4/1.

After 9 hours of polymerization, part of the reaction solution was sampled, then the molecular weight was measured by GPC measurement to find that Mn was 16000, PDI was 1.44, the molecular weight at the peak top was 23000, a peak originated from the raw materials, particularly a peak originated from the macromonomer was not observed, and as a result of the solid content measurement, the conversion was almost 100%. The amine value was 43.6 mgKOH/g. Thereafter, nitrogen blowing was stopped, then the temperature was raised to 90° C. while blowing air instead of nitrogen to detach the iodine bonded to the terminal of the polymer chain. Furthermore, the reaction solution was transferred to a 2 L beaker, 166.2 parts of PGMAc was added to dilute the solution so that the solid content became 30%, thereafter 25 g of SHIRASAGI M was added as activated carbon to adsorb iodine under stirring at room temperature for 12 hours, and thereafter the activated carbon was removed by filtration with a filter to obtain a yellow transparent liquid. The solid content of the obtained liquid was 30.5%. The resin solution was designated as basic pigment dispersant-2, and the basic pigment dispersant-2 falls within an example of the present invention.

Synthesis Example 8: Basic Pigment Dispersant-3

Basic pigment dispersant-3 was synthesized by the method I using the same apparatus as in Synthesis Example 1. Charged were 349.3 parts of PGMAc, 180 parts (0.060 mol) of CLMA, 47.1 parts (0.300 mol) of DMAEMA, and 18.0 parts (0.180 mol) of MMA, and the resultant mixture was homogenized while dissolving CLMA. Next, 3.1 parts (0.0122 mol) of iodine, 14.8 parts of V-70, and 0.5 parts of DPM were charged. Next, polymerization was conducted at 40° C. for 9 hours while blowing nitrogen. In the above-described polymerization, the ratio of the total number of moles of the methacrylate-based monomers to 1 mol of the polymerization-initiating compound is 22.1/1.

After 9 hours of polymerization, part of the reaction solution was sampled, then the molecular weight was measured by GPC measurement to find that Mn was 10200, PDI was 1.43, the molecular weight at the peak top was 15000, a peak originated from the raw materials, particularly a peak originated from the macromonomer was not observed, and as a result of the solid content measurement, the conversion was almost 100%. The amine value was 67.9 mgKOH/g. Thereafter, nitrogen blowing was stopped, then the temperature was raised to 90° C. while blowing air instead of nitrogen to isolate the iodine bonded to the terminal of the polymer chain, and it was confirmed that the iodine was isolated by the fact that the polymer solution turned to a brown transparent solution. Furthermore, the solution was diluted by adding 204.2 parts of PGMAc, thereafter 50 g of SHIRASAGI M was added as activated carbon to adsorb iodine under stirring at room temperature for 12 hours, and thereafter the activated carbon was removed by filtration with a filter to obtain a yellow transparent liquid. The solid content of the obtained liquid was 30.2%. The resin solution was designated as basic pigment dispersant-3, and the basic pigment dispersant-3 falls within an example of the present invention.

Synthesis Example 9: Basic Pigment Dispersant-4

Basic pigment dispersant-4 was synthesized by the method I using the same apparatus as in Synthesis Example 1. In the present Synthesis Example, first of all, a macromonomer in which a methacrylate residue is bonded to a terminal of a glycol chain through a urea bond was obtained in a manner as described below. As a solvent, 102.7 parts of DBE, and 11.6 parts (0.0748 mol) of MOI were charged and stirred. Next, a mixed solution of 150 parts of M2005 and 200 parts of DBE was added, and the resultant mixture was stirred at room temperature for 30 minutes. It was confirmed by IR that the reaction of the isocyanate group had been completed. The obtained macromonomer was used as a raw material, and therefore the use amount of the methacrylate-based macromonomer (B) used in the present Synthesis Example is 0.0748 mol. Next, 23.6 parts (0.150 mol) of DMAEMA and 22.5 parts (0.225 mol) of MMA were charged in the above-described macromonomer, then the resultant mixture was homogenized, and 1.5 parts (0.00591 mol) of iodine, 7.4 parts of V-70, and 0.3 parts of DPM were further charged. Next, polymerization was conducted at 40° C. for 9 hours while blowing nitrogen. In the above-described polymerization, the ratio of the total number of moles of the methacrylate-based monomers to 1 mol of the polymerization-initiating compound is 38/1.

After 9 hours of polymerization, part of the reaction solution was sampled, then the molecular weight was measured by GPC measurement to find that Mn was 17300, PDI was 1.41, the molecular weight at the peak top was 24200, a peak originated from the raw materials, particularly a peak originated from the macromonomer was not observed, and as a result of the solid content measurement, the conversion was almost 100%. The amine value was 40.0 mgKOH/g. Thereafter, nitrogen blowing was stopped, then the temperature was raised to 90° C. while blowing air instead of nitrogen to isolate the iodine bonded to the terminal of the polymer chain, and it was confirmed that the iodine was isolated by the fact that the polymer solution turned to a brown transparent solution. Furthermore, the solution was diluted by adding 173.3 parts of DBE, thereafter 25 g of SHIRASAGI M was added as activated carbon to adsorb iodine under stirring at room temperature for 12 hours, and thereafter the activated carbon was removed by filtration with a filter to obtain a yellow transparent liquid. The solid content of the obtained liquid was 29.9%. The obtained liquid was designated as basic pigment dispersant-4, and the basic pigment dispersant-4 falls within an example of the present invention.

The compositions and physical properties of respective polymers specified in the present invention and used for respective basic pigment dispersants which were obtained by the above-described Synthesis Examples 6 to 9 and fall within examples of the present invention are shown together in Table 2.

TABLE 2

Compositions and Physical Properties of Polymers Obtained by Synthesis Examples 6 to 9

|  | Synthesis Example 6 | Synthesis Example 7 | Synthesis Example 8 | Synthesis Example 9 |
| --- | --- | --- | --- | --- |
| Basic pigment dispersant | -1 | -2 | -3 | -4 |
| Synthesis method | Method I | Method I | Method I | Method I |
| Solvent | PGMAc | PGMAc | PGMAc | DBE |
| Composition of side chain | Poly-propylene glycol | Poly-propylene glycol/poly-ethylene glycol | Poly-caprolactone | Poly-propylene glycol/poly-ethylene glycol |
| Composition | BzMA/DMAEMA/PP800 | MMA/DMAEMA/MOI/M2005 | MMA/DMAEMA/CLMA | MMA/DMAEMA/MOI/M2005 |
| Composition ratio (mass ratio) | 6.8/15.3/77.9 | 3.9/12.2/6.1/77.8 | 7.4/19.2/73.4 | 10.8/11.3/5.7/72.2 |
| Monomer/initiation compound (molar ratio) | 28.3/1 | 25.4/1 | 22.1/1 | 38/1 |
| Mn | 12800 | 16000 | 10200 | 17300 |
| PDI | 1.33 | 1.44 | 1.43 | 1.41 |
| Amine value (mgKOH/g) | 54.6 | 43.6 | 67.9 | 40.0 |
| Solid content (%) | 30.7 | 30.5 | 30.2 | 29.9 |

Synthesis Example 10: Basic Pigment Dispersant-5

A polymer was obtained using the same apparatus as in Synthesis Example 1 by the previously described method II in a manner as described below. In the present Synthesis Example, first of all, 174.7 parts of PGMAc, 34.9 parts (0.225 mol) of MOI as a methacrylate (D) having an isocyanate group, 26.4 parts (0.150 mol) of BzMA, 1.5 parts (0.00591 mol) of iodine, 7.4 parts of V-70 and 0.3 parts of DPM were charged and living radical polymerization was conducted at 45° C. for 8 hours. After 8 hours of polymerization, part of the reaction solution was sampled, then the molecular weight was measured by GPC measurement to find that Mn was 4900, PDI was 1.22, the molecular weight at the peak top was 6000, and as a result of the solid content measurement, the conversion was almost 100%. Moreover, the existence of the isocyanate was confirmed by IR measurement. The polymer obtained above falls within the polymer (E) specified in the present invention. In the above-described polymerization, the ratio of the total number of moles of the methacrylate-based monomers to 1 mol of the polymerization-initiating compound is 31.7/1.

Thereafter, nitrogen blowing was stopped, then the temperature was raised to 90° C. while blowing air instead of nitrogen to isolate the iodine bonded to the terminal of the polymer chain, and it was confirmed that the iodine was isolated from the fact that the polymer solution turned into a brown transparent liquid. Next, the polymer obtained above was used as a raw material, and a mixed solution of 150 parts of M2005 falling within the compound (G) specified in the present invention and 133 parts of PGMAc was prepared and added in the reaction vessel. Heat generation to a certain extent was observed. Part of the reaction solution was sampled, and IR measurement was conducted to confirm that the isocyanate had decreased and the urea bond had been formed. Moreover, the solid content was 40.5%. Besides, the isocyanate % was measured in a manner as described below. In a conical beaker, 0.5 parts of the sampled product was placed and diluted with 50 ml of toluene, and 10 ml of 0.1 N isopropanol solution of dibutylamine was added, and next the isocyanate % was calculated according to calculation formula by titrating the isocyanate with a 0.1N isopropanol solution of hydrochloric acid using bromophenol blue as an indicator. As a result thereof, the isocyanate % was 2.95%. This state is a state where isocyanates that are reactable with the main chain are left unreacted. In addition, the isocyanate % was determined in the same manner in the following Synthesis Examples.

Next, a mixed solution of 15.3 parts of 3-N,N-dimethylaminopropylamine (hereinafter, written as DMAPA) falling within the compound (F) specified in the present invention and 23.0 parts of PGMAc was added, and the resultant mixture was subjected to reaction at room temperature for 30 minutes to confirm the disappearance of the isocyanate group by IR measurement. The molecular weight was measured by GPC measurement to find that Mn was 18900, PDI was 1.51, and the molecular weight at the peak top was 28100, and the amine value was 37.4 mgKOH/g. The solution was diluted by adding 188.8 parts of PGMAc, thereafter 30 g of SHIRASAGI M was added as activated carbon to adsorb iodine under stirring at room temperature for 12 hours, and thereafter the activated carbon was removed by filtration with a filter to obtain a yellow transparent liquid. The solid content of the obtained liquid was 30.9%. The resin solution was designated as basic pigment dispersant-5, and the basic pigment dispersant-5 falls within an example of the present invention.

Synthesis Example 11: Basic Pigment Dispersant-6

A polymer was obtained using the same apparatus as in Synthesis Example 1 by the method II in a manner as described below. Charged were 166 parts of PGMAc, 32.0 parts (0.225 mol) of glycidyl methacrylate (hereinafter, written as GMA) (Mw=142.15) as a methacrylate (D) having an epoxy group, 26.4 parts (0.150 mol) of BzMA, 1.5 parts (0.00591 mol) of iodine, 7.4 parts of V-70 and 0.3 parts of DPM, and living radical polymerization was conducted at 45° C. for 8 hours. After 8 hours of polymerization, part of the reaction solution was sampled, then the molecular weight was measured by GPC measurement to find that Mn was 5900, PDI was 1.21, and the molecular weight at the peak top was 7100, and as a result of the solid content measurement, the conversion was almost 100%. Moreover, the existence of the epoxy group was confirmed by IR measurement. The polymer obtained above falls within the polymer (E) specified in the present invention. In the above-described polymerization, the ratio of the total number of moles of the methacrylate-based monomers to 1 mol of the polymerization-initiating compound is 31.7/1.

Thereafter, nitrogen blowing was stopped, then the temperature was raised to 90° C. while blowing air instead of nitrogen to isolate the iodine bonded to the terminal of the polymer chain, and it was confirmed that the iodine was isolated from the fact that the polymer solution turned into a brown transparent liquid. Next, the polymer obtained above was used as a raw material, the polymer solution was heated to 70° C., 16.2 parts of 4-aminomethyl pyridine (hereinafter, written as AMP) falling within the compound (F) specified in the present invention was added, the resultant mixture was heated for 3 hours to react the amino group with the epoxy group, next a mixed solution of 150 parts of M2005 falling within the compound (G) specified in the present invention and 161.7 parts of PGMAc was further added, and the reaction was conducted for 3 hours. The disappearance of the epoxy group was confirmed by IR measurement. The molecular weight was measured by GPC measurement to find that Mn was 18500, PDI was 1.53, and the molecular weight at the peak top was 18200, and the amine value was 37.3 mgKOH/g. The solution was diluted by adding 187.2 parts of PGMAc, thereafter 30 g of SHIRASAGI M was added as activated carbon to adsorb iodine under stirring at room temperature for 12 hours, and thereafter the activated carbon was removed by filtration with a filter to obtain a yellow transparent liquid. The solid content of the obtained liquid was 30.1%. The obtained liquid was designated as basic pigment dispersant-6, and the basic pigment dispersant-6 falls within an example of the present invention.

Synthesis Example 12: Basic Pigment Dispersant-7

A polymer was obtained using the same apparatus as in Synthesis Example 1 by the method II in a manner as described below. Charged were 158.5 parts of tetraethylene glycol dimethyl ether (hereinafter, written as DMTG) as a solvent, 16.3 parts (0.105 mol) of MOI as a methacrylate (D) having an isocyanate group, 39.6 parts (0.225 mol) of BzMA, 1.5 parts (0.00591 mol) of iodine, 7.4 parts of V-70 and 0.3 parts of DPM, and living radical polymerization was conducted at 45° C. for 8 hours. After 8 hours of polymerization, part of the reaction solution was sampled, then the molecular weight was measured by GPC measurement to find that Mn was 4800, PDI was 1.25, the molecular weight at the peak top was 6100, and as a result of the solid content measurement, the conversion was almost 100%. Moreover, the existence of the isocyanate was confirmed by IR measurement. The polymer obtained above falls within the polymer (E) specified in the present invention. In the above-described polymerization, the ratio of the total number of moles of the methacrylate-based monomers to 1 mol of the polymerization-initiating compound is 27.9/1.

Next, a mixed solution of 150 parts of M2005 falling within the compound (G) specified in the present invention and 141.1 parts of PGMAc was prepared and added in the reaction vessel. Part of the reaction solution was sampled, and IR measurement was conducted to confirm that the isocyanate had decreased and the urea bond had been formed. Moreover, the solid content was 40.6%. Besides, the isocyanate % was 0.60%. Thereafter, nitrogen blowing was stopped, then the temperature was raised to 90° C. while blowing air instead of nitrogen to isolate the iodine bonded to the terminal of the polymer chain, and it was confirmed that the iodine was isolated from the fact that the polymer solution turned into a brown transparent liquid.

Next, 4.3 parts of mono-2-hydroxyethyl phosphate (hereinafter, written as HEP) falling within the compound (F) specified in the present invention and 0.2 parts of dibutyltin dilaurate as a catalyst were added, and the reaction was conducted at 70° C. for 3 hours. The disappearance of the isocyanate group was confirmed by IR measurement. The molecular weight was measured by GPC measurement to find that Mn was 17400, PDI was 1.55, and the molecular weight at the peak top was 26200, and the acid value was 22.4 mgKOH/g. The polymer is an acidic dispersant in which a phosphate group is bonded to the main chain.

The solution was diluted by adding 181.7 parts of DMTG, thereafter 30 g of SHIRASAGI M was added as activated carbon to adsorb iodine under stirring at room temperature for 12 hours, and thereafter the activated carbon was removed by filtration with a filter to obtain a yellow transparent liquid. The solid content of the obtained liquid was 30.0%. The obtained liquid was designated as acidic pigment dispersant-7, and the acidic pigment dispersant-7 falls within an example of the present invention.

Comparative Synthesis Example 2: Comparative Pigment Dispersant-2

In place of CLMA being a polycaprolactone monomethacrylate having a molecular weight of 3000 and used in Synthesis Example 8, 214.8 parts (0.60 mol) of a polycaprolactone methacrylate (product name: Placcel FM2D, manufactured by Daicel Corporation, liquid form, average degree of polymerization 2, hereinafter, written as FM2D) having a molecular weight of 358, 397.5 parts of PGMAc, 47.1 parts (0.300 mol) of DMAEMA, 15.0 parts (0.150 mol) of MMA were charged and homogenized. Next, 3.1 parts (0.0122 mol) of iodine, 14.8 parts of V-70, and 0.5 parts of DPM were charged. Next, living radical polymerization was conducted at 40° C. for 9 hours while blowing nitrogen. In the above-described polymerization, the ratio of the total number of moles of the methacrylate-based monomers to 1 mol of the polymerization-initiating compound is 43.0/1. However, the polymer does not have, in the structure thereof, a particular polymer chain that is essential in the present invention.

Part of the reaction solution was sampled, then the molecular weight was measured by GPC measurement to find that Mn was 11500, PDI was 1.38, the molecular weight at the peak top was 15700, a peak originated from the raw materials, particularly a peak originated from the macromonomer was not observed, and as a result of the solid content measurement, the conversion was almost 100%. The amine value was 60.7 mgKOH/g. Thereafter, nitrogen blowing was stopped, and the solution was heated to 90° C. while blowing air instead of nitrogen to isolate the iodine bonded to the terminal of the polymer chain, and it was confirmed that the iodine was isolated from the fact that the polymer solution turned into a brown transparent liquid. Furthermore, the solution was diluted by adding 230.2 parts of PGMAc, thereafter 50 g of SHIRASAGI M was added as activated carbon to adsorb the iodine under stirring at room temperature, and thereafter the activated carbon was removed by filtration with a filter to obtain a yellow transparent liquid. The solid content of the obtained liquid was 30.1%. And the obtained liquid was designated as Comparative Pigment Dispersant-2.

The compositions and physical properties of respective polymers that are specified in the present invention and that were used for respective pigment dispersants which were obtained by the above-described Synthesis Examples of 10 to 12 and which fall within examples of the present invention are shown together in Table 3. In any of the Synthesis Examples, production was conducted using the method II.

TABLE 3

Compositions and Physical Properties of Polymers Obtained by Synthesis Examples 10 to 12

|  | Synthesis Example 10 | Synthesis Example 11 | Synthesis Example 12 |
|---|---|---|---|
| Dispersant | Basic pigment dispersant-5 | Basic pigment dispersant-6 | Acidic pigment dispersant-7 |

TABLE 3-continued

Compositions and Physical Properties of Polymers Obtained by Synthesis Examples 10 to 12

|  | Synthesis Example 10 | Synthesis Example 11 | Synthesis Example 12 |
|---|---|---|---|
| Synthesis method | Method II | Method II | Method II |
| Solvent | PGMAc | PGMAc | DMTG |
| Composition of side chain | Polypropylene glycol/polyethylene glycol | Polypropylene glycol/polyethylene glycol | Polypropylene glycol/polyethylene glycol |
| Composition | BzMA/MOI/DMAPA/M2005 | BzMA/GMA/AMP/M2005 | BzMA/MOI/HEP/M2005 |
| Composition ratio (mass ratio) | 11.6/15.4/6.8/66.2 | 11.8/14.2/7.2/66.8 | 18.9/7.7/2.0/71.4 |
| Monomer/initiation compound (molar ratio) | 31.7/1 | 31.7/1 | 27.9/1 |
| Mn | 18900 | 18500 | 17400 |
| PDI | 1.51 | 1.53 | 1.55 |
| Amine value or acid value (mgKOH/g) | 37.4 | 37.3 | 22.4 |
| Solid content (%) | 30.9 | 30.1 | 30.0 |

The composition and physical properties of the polymer that was used for the pigment dispersant which was obtained by the above-described Synthesis Example 2 and which falls within an comparative example of the present invention are shown together in Table 4.

TABLE 4

Composition and Physical Properties of Polymer Obtained by Comparative Synthesis Example 2

|  | Comparative Synthesis Example 2 |
|---|---|
| Dispersant | Comparative Pigment dispersant-2 |
| Synthesis method | Method I |
| Solvent | PGMAc |
| Composition of side chain | Polycaprolactone |
| Composition | MMA/DMAEMA/FM2D |
| Composition ratio (mass ratio) | 5.4/17/77.6 |
| Monomer/initiation compound (molar ratio) | 43.0/1 |
| Mn | 11500 |
| PDI | 1.38 |
| Amine value (mgKOH/g) | 60.7 |
| Solid content (%) | 30.1 |

<Application to Coloring Agents for Color Filters>

Examples 1 to 12, and Comparative Example 1: Pigment Dispersion Liquids (a) Micronization Treatment of Pigments As pigments for color filters, PR 254, PG 58, PY 138, PY 150, PB 15:6 and PV 23 were prepared, and micronization treatment was applied by a method as described below. In a kneader (pressurizing kneader, manufactured by Moriyama) equipped with a sealing lid for use during pressurization, 100 parts of each pigment, 400 parts of sodium chloride, and 130 parts of diethylene glycol were charged. Premix was conducted until a uniformly wetted lump was formed in the kneader. The pressurizing lid was closed, and milling and grinding treatment was conducted for 7 hours while pressing the contents at a pressure of 6 kg/cm² to obtain a ground material. The obtained ground material was put into 3000 parts of 2% sulfuric acid, and stirring treatment was conducted for 1 hour. After sodium chloride and diethylene glycol were removed by filtration, the residue was sufficiently washed with water and then dried and pulverized to obtain each pigment powder. The average particle diameter of the pigment powders was about 30 nm.

(b) Preparation of Pigment Dispersion Liquids-1

Each component shown in Table 5 was blended in an amount (parts) as shown in Table 5, and the resultant mixture was stirred with a dissolver for 2 hours. After confirming that the lump of the pigment disappeared, dispersion treatment was conducted using a horizontal media disperser to prepare each pigment dispersion liquid. In addition, in Table 5, the "synergist 1", the "synergist 2", and the "synergist 3" each are a dye derivative having an amino group or amino groups and represented by the following structural formula (1) (in the formula, n=1 to 2), the following structural formula (2), and the following structural formula (3) (in the formula, n=1 to 2), respectively. Moreover, an acrylic resin having a monomer composition of BzMA/MAA=80/20 (mass ratio) and having an Mn of 5500 and a PDI of 2.02 each determined by GPC measurement (measured using a PGMAc solution having a solid concentration of 30%) was used as the "acrylic resin" in Table 5.

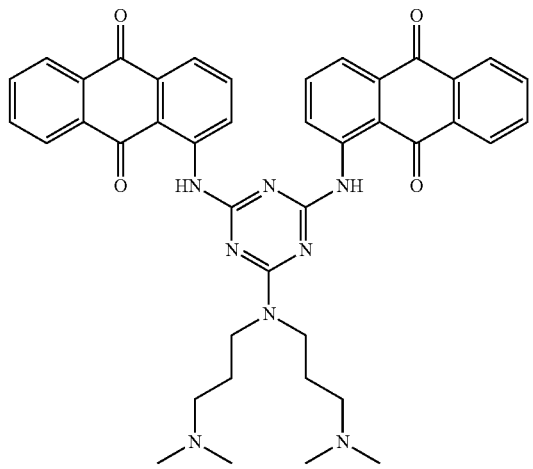

(2)

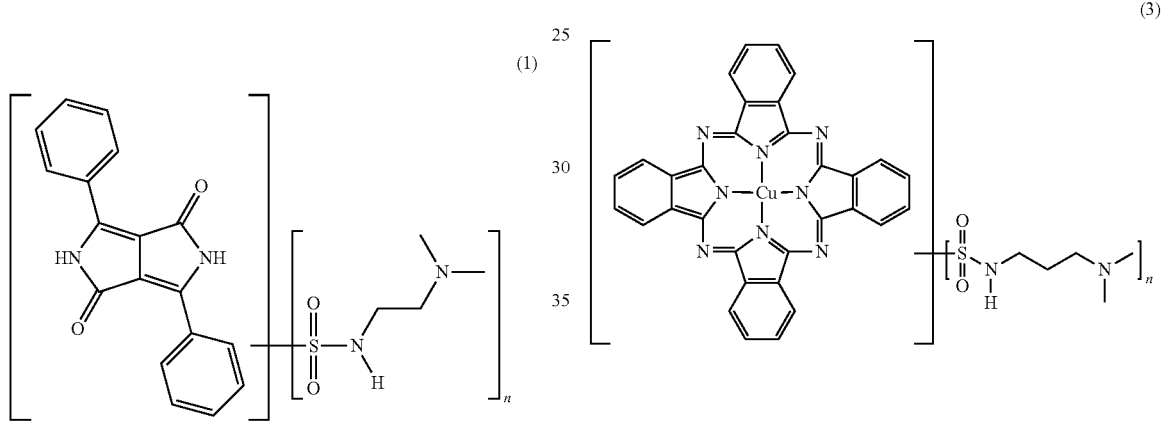

(1)

(3)

TABLE 5

| | Example 1 Red PDL(*1)-1 | Example 2 Green PDL-1 | Example 3 Yellow PDL-1 | Example 4 Yellow PDL-2 | Example 5 Blue PDL-1 | Example 6 Violet PDL-1 |
|---|---|---|---|---|---|---|
| PR 254 (30 nm) | 13.5 | | | | | |
| PG 58 (30 nm) | | 13.5 | | | | |
| PY 138 (30 nm) | | | 13.5 | | | |
| PY 150 (30 nm) | | | | 13.5 | | |
| PB 15:6 (30 nm) | | | | | 13.5 | |
| PV 23 (30 nm) | | | | | | 13.5 |
| Acidic PD(*2)-1 | | 24.8 | | | | |
| Acidic PD-2 | 24.7 | | | | | |
| Acidic PD-3 | | | | | 24.4 | 24.4 |
| Acidic PD-4 | | | 24.8 | | | |
| Acidic PD-6 | | | | 25.0 | | |
| Synergist 1 | 1.5 | | | | | |
| Synergist 2 | | 1.5 | 1.5 | 1.5 | | |
| Synergist 3 | | | | | 1.5 | 1.5 |

TABLE 5-continued

| | Preparation of Pigment Dispersion Liquids (unit: part) | | | | | |
|---|---|---|---|---|---|---|
| | Example 1 Red PDL[(*1)]-1 | Example 2 Green PDL-1 | Example 3 Yellow PDL-1 | Example 4 Yellow PDL-2 | Example 5 Blue PDL-1 | Example 6 Violet PDL-1 |
| Acrylic resin | 15 | 15 | 15 | 15 | 15 | 15 |
| PGMAc | 45.3 | 45.2 | 45.2 | 45.0 | 45.6 | 45.6 |
| Total | 100 | 100 | 100 | 100 | 100 | 100 |

[(*1)]PDL represents "pigment dispersion liquid".
[(*2)]PD represents "pigment dispersant".

[Evaluation of Pigment Dispersion Liquids (1)]

Measurement results of the average particle diameter of the pigments contained in the respective pigment dispersion liquids obtained as described above, and measurement results of the initial viscosity of the pigment dispersion liquids and the viscosity (viscosity after storage) after the pigment dispersion liquids were left standing at 45° C. for 3 days are shown together in Table 6. In addition, an E-type viscometer was used for the viscosity measurement, and the viscosity was measured at 60 rpm and 25° C.

TABLE 6

| | Physical Properties of Respective Pigment Dispersion Liquids | | | | | |
|---|---|---|---|---|---|---|
| | Example 1 Red PDL[(*)]-1 | Example 2 Green PDL-1 | Example 3 Yellow PDL-1 | Example 4 Yellow PDL-2 | Example 5 Blue PDL-1 | Example 6 Violet PDL-1 |
| Average particle diameter (nm) | 41 | 40 | 37 | 43 | 36 | 40 |
| Initial viscosity (mPa·s) | 7.0 | 4.6 | 6.9 | 4.9 | 7.5 | 7.6 |
| Viscosity after storage (mPa·s) | 7.0 | 4.5 | 6.8 | 4.7 | 7.4 | 7.6 |

[(*)]PDL represents "pigment dispersion liquid".

As shown in Table 6, any of the average particle sizes of the pigments contained in the pigment dispersion liquids of Examples 1 to 6 was 50 nm or less, and it was proved that the micronized pigments were finely dispersed to a sufficient degree. Moreover, any of the pigment dispersion liquids of Examples 1 to 6 had an initial viscosity of 10 mPa·s or less. Moreover, the initial viscosity and the viscosity after storage were compared to confirm that the change in viscosity was extremely small. From the above-described results, it is clear that the pigment dispersion liquids of Examples 1 to 6 have a sufficient dispersion stability.

(c) Preparation of Pigment Dispersion Liquids-2

Each component shown in Table 7 was blended in an amount (parts) as shown in Table 7 (parts), and the resultant mixture was stirred with a dissolver for 2 hours. After confirming that the lump of the pigment disappeared, dispersion treatment was conducted using a horizontal media disperser to prepare each pigment dispersion liquid. In addition, in Table 7, the "synergist 4", the "synergist 5", and the "synergist 6" each are a dye derivative having a sulfonate group or sulfonate groups and represented by the following structural formula (4) (in the formula, n=1 to 2), the following structural formula (5)(in the formula, n=1 to 2), and the following structural formula (6) (in the formula, n=1 to 2), respectively. Moreover, an acrylic resin having a monomer composition of BzMA/MAA=80/20 (mass ratio) and having an Mn of 5500 and a PDI of 2.02 each determined by GPC measurement (measured using a PGMAc solution having a solid concentration of 30%) was used as the "acrylic resin" in Table 7.

(4)

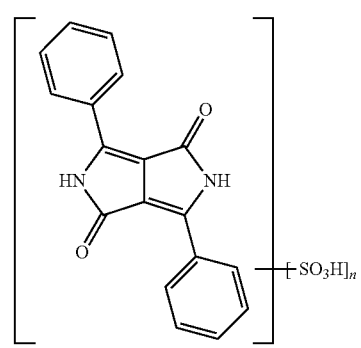

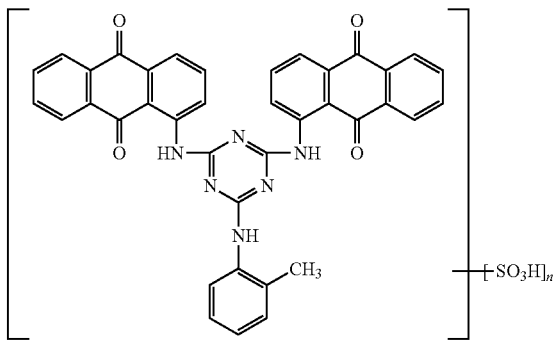

(5)

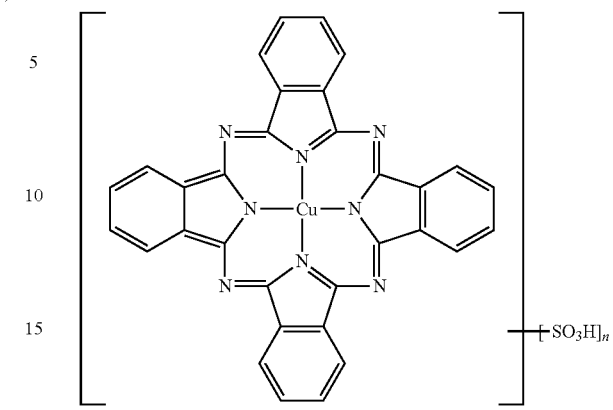

(6)

TABLE 7

Preparation of Pigment Dispersion Liquids (unit: part)

|  | Example 7 Red PDL(*1)-2 | Example 8 Green PDL-2 | Example 9 Yellow PDL-3 | Example 10 Yellow PDL-4 | Example 11 Blue PDL(*1)-2 | Example 12 Violet PDL-2 | Comparative Example 1 Blue PDL-3 |
|---|---|---|---|---|---|---|---|
| PR 254 (30 nm) | 13.5 | | | | | | |
| PG 58 (30 nm) | | 13.5 | | | | | |
| PY 138 (30 nm) | | | 13.5 | | | | |
| PY 150 (30 nm) | | | | 13.5 | | | |
| PB 15:6 (30 nm) | | | | | 13.5 | | 13.5 |
| PV 23 (30 nm) | | | | | | 13.5 | |
| Basic PD(*2)-1 | 24.4 | | | | | | |
| Basic PD-2 | | | | | 24.6 | 24.6 | |
| Basic PD-3 | | | 24.8 | | | | |
| Basic PD-5 | | | | 24.3 | | | |
| Basic PD-6 | | 24.9 | | | | | |
| Comparative PD-2 | | | | | | | 24.9 |
| Synergist 4 | 1.5 | | | | | | |
| Synergist 5 | | 1.5 | 1.5 | 1.5 | | | |
| Synergist 6 | | | | | 1.5 | 1.5 | 1.5 |
| Acrylic resin | 15 | 15 | 15 | 15 | 15 | 15 | 15 |
| PGMAc | 45.6 | 45.1 | 45.2 | 45.7 | 45.4 | 45.4 | 45.1 |
| Total | 100 | 100 | 100 | 100 | 100 | 100 | 100 |

(*1)PDL represents "pigment dispersion liquid"
(*2)PD represents "pigment dispersion".

[Evaluation of Pigment Dispersion Liquids (2)]

Measurement results of the average particle diameter of the pigments contained in the respective pigment dispersion liquids obtained as described above, and measurement results of the initial viscosity of the pigment dispersion liquids and the viscosity after the pigment dispersion liquids were left standing at 45° C. for 3 days (viscosity after storage) are shown in Table 8.

TABLE 8

Physical Properties of Pigment Dispersion Liquids

|  | Example 7 Red PDL(*1)-2 | Example 8 Green PDL-2 | Example 9 Yellow PDL-3 | Example 10 Yellow PDL-4 | Example 11 Blue PDL-2 | Example 12 Violet PDL-2 | Comparative Example 1 Blue PDL-3 |
|---|---|---|---|---|---|---|---|
| Average particle diameter (nm) | 40 | 39 | 38 | 39 | 35 | 41 | 45 |
| Initial viscosity (mPa·s) | 7.1 | 6.8 | 7.8 | 6.9 | 8.9 | 9.1 | 9.6 |

TABLE 8-continued

Physical Properties of Pigment Dispersion Liquids

|  | Example 7 Red PDL(*1)-2 | Example 8 Green PDL-2 | Example 9 Yellow PDL-3 | Example 10 Yellow PDL-4 | Example 11 Blue PDL-2 | Example 12 Violet PDL-2 | Comparative Example 1 Blue PDL-3 |
|---|---|---|---|---|---|---|---|
| Viscosity after storage (mPa · s) | 7.1 | 6.7 | 7.7 | 6.9 | 8.8 | 8.9 | 57 |

(*1)PDL represents "pigment dispersion liquid".

As shown in Table 8, any of the average particle sizes of the pigments contained in the pigment dispersion liquids of Examples 7 to 12 was 50 nm or less, and it was proved that the micronized pigments were finely dispersed to a sufficient degree. Moreover, any of the pigment dispersion liquids of Examples 7 to 12 had an initial viscosity of 10 mPa·s or less. Moreover, the initial viscosity and the viscosity after storage were compared to confirm that the change in viscosity was extremely small. From the above-described results, it is clear from the above-described results that the pigment dispersion liquids of Examples 7 to 12 have a sufficient dispersion stability.

On the contrary, it is understood that the pigment dispersion liquid of Comparative Example 1, when compared with the pigment dispersion liquid of Example 11 in which the similar pigment and the similar synergist are used, has a larger average particle diameter and the pigment is not finely dispersed to a sufficient degree. Furthermore, from the fact that the viscosity after storage greatly increases, it has been <Application to Resists for Color Filters>

Application Example 1 to 6: Resists for Color Filters

Each component shown in Table 9 and including the pigment dispersion liquid obtained by each Example as a coloring agent was blended in an amount (parts) shown in Table 9, and the resultant mixture was sufficiently mixed with a mixer to obtain each color pigment coloring agent composition (pigment ink) for color filters as a color resist. In addition, the "photosensitive acrylic resin varnish" in Table 9 is varnish containing an acrylic resin obtained by reacting a copolymerized product of BzMA/MAA with glycidyl methacrylate. This acrylic resin had an Mn of 6000, a PDI of 2.38, and an acid value of 110 mgKOH/g. Moreover, "TMPTA" represents trimethylolpropane triacrylate, "HEMPA" represents 2-hydroxyethyl-2-methyl propionic acid, and "DEAP" represents 2,2-diethoxy acetophenone.

TABLE 9

Preparation of Resists for Color Filters (unit: part)

|  | Application Example 1 Red pigment ink-1 | Application Example 2 Green pigment ink-1 | Application Example 3 Blue pigment ink-1 | Application Example 4 Red pigment ink-1 | Application Example 5 Green pigment ink-1 | Application Example 6 Blue pigment ink-1 |
|---|---|---|---|---|---|---|
| Red PDL(*)-1 of Example 1 | 56.7 |  |  |  |  |  |
| Green PDL-1 of Example 2 |  | 40 |  |  |  |  |
| Yellow PDL-1 of Example 3 | 10 |  |  |  |  |  |
| Yellow PDL-2 of Example 4 |  | 26.7 |  |  |  |  |
| Blue PDL-1 of Example 5 |  |  | 56.7 |  |  |  |
| Violet PDL-1 of Example 6 |  |  | 10 |  |  |  |
| Red PDL-2 of Example 7 |  |  |  | 56.7 |  |  |
| Green PDL-2 of Example 8 |  |  |  |  | 40 |  |
| Yellow PDL-3 of Example 9 |  |  |  | 10 |  |  |
| Yellow PDL-4 of Example 10 |  |  |  |  | 26.7 |  |
| Blue PDL-2 of Example 11 |  |  |  |  |  | 56.7 |
| Violet PDL-2 of Example 12 |  |  |  |  |  | 10 |
| Photosensitive acrylic resin varnish | 25 | 25 | 25 | 25 | 25 | 25 |
| TMPTA | 5 | 5 | 5 | 5 | 5 | 5 |
| HEMPA | 1 | 1 | 1 | 1 | 1 | 1 |
| DEAP | 0.5 | 0.5 | 0.5 | 0.5 | 0.5 | 0.5 |
| PGMAc | 1.8 | 1.8 | 1.8 | 1.8 | 1.8 | 1.8 |
| Total | 100 | 100 | 100 | 100 | 100 | 100 |

(*)PDL represents "pigment dispersion liquid".

understood that the dispersion stability is also insufficient. It is considered that this is because the caprolactone chain which is a part dissolved in a solvent is short and therefore aggregation of pigments occurs during storage to make the dispersion stability insufficient although the initial viscosity is favorable.

A glass substrate treated with a silane coupling agent was set to a spin coater. The red pigment ink-1 of Application Example 1 was spin-coated on the glass substrate under the condition of 300 rpm for 5 seconds. After 10 minutes of pre-bake at 80° C., a red glass substrate was produced by exposing the substrate with light at a light amount of 100 mJ/cm$^2$ using an ultra-high pressure mercury lamp. Moreover, the same operation was conducted with respect to Application Examples 2 to 6, and glass substrates of respective colors were produced.

Any one of the obtained glass substrates (color glass substrates) of respective colors had an excellent spectroscopic curve property and also had an excellent fastness such as light fastness and heat resistance. Moreover, anyone of color glass substrates had excellent optical properties such as a light transmitting property and a contrast ratio.

Comparative Application Example 1: Resist for Color Filters

A blue pigment dispersion liquid for comparison was prepared in the same manner as in the aforementioned Example 5 except that (i) a polyester-based dispersant (a condensate of poly ε-caprolactone with polyethyleneimine, obtained by using 12-hydroxystearic acid as an initiation compound, Mn: 12000, amine value: 12 mgKOH/g) was used in place of "acidic pigment dispersant-3" which was used in Example 5, and (ii) "synergist 6" was used in place of "synergist 3".

And, a blue pigment ink (Comparative Application Example 1) was prepared and a blue glass substrate for comparison was produced in the same manner as in Application Example 3 except that the blue pigment dispersion liquid for comparison prepared above was used in place of "blue pigment dispersion liquid-1 of Example 5" in Application Example 3.

(Alkali Developability Test)

A spot of a 0.1 N tetramethylammonium hydroxide aqueous solution was placed every 5 seconds on each color glass substrate produced using each pigment ink of Application Examples 1 to 3 and Comparative Application Example 1. And, it was checked by eye observation as to "how many seconds after placing the solution does it take until the exposed part of the coated film dissolve?" The results are shown in Table 10.

TABLE 10

Alkali Developability Test Results

| Pigment ink used | Color of glass substrate | Dissolution time (sec) | Developing behavior | Dissolution residue |
|---|---|---|---|---|
| Red pigment ink-1 of Application Example 1 | Red | 15 | Dissolved | Not existed |
| Green pigment ink-1 of Application Example 2 | Green | 15 | Dissolved | Not existed |
| Blue pigment ink-1 of Application Example 3 | Blue | 20 | Dissolved | Not existed |
| Blue pigment ink of Comparative Application Example 1 | Blue | >60 | Detached in film | Existed |

As shown in Table 10, the coated film of the exposed part dissolved in a short time without producing a dissolution residue (film dregs) in any of the glass substrates produced using red pigment ink-1 of Application Example 1, green pigment ink-1 of Application Example 2, and blue pigment ink-1 of Application Example 3 to exhibit a favorable developability. In addition, it was able to be confirmed that any edge in the coated films left undissolved was sharp when observed by a microscope. That is to say, when the pigment coloring agent compositions (pigment inks) of Application Examples 1 to 3 are used, the developing time can be shorten, and therefore an improvement in productivity can be expected.

On the contrary, it took 60 seconds or more for the exposed part of the coated film to completely disappear in the glass substrate produced using the blue pigment ink of Comparative Application Example 1. It is considered that the reason why the developing time became long is because the pigment dispersant which is unsuitable for the alkali development was used. Moreover, also regarding the glass substrate, the exposed part of the coated film was detached in a film state, and the residue was produced. It is considered that this is because the pigment dispersant is not alkali-soluble. From the above-described results, it has been proved that the coated film formed using any of pigment inks of Application Examples 1 to 3 where the pigment dispersants of the present invention are used has an excellent alkali developability.

<Application to Coloring Agents for Aqueous Inkjet Inks>

Examples 13 and 14

In a 500 ml vat, 16.4 parts of acidic pigment dispersant-2 obtained by Synthesis Example 2 and 83.6 parts of water were mixed and homogenized. A transparent solution was obtained. Next, a mill base was obtained by gradually adding 100 parts of a titanium oxide pigment (JR-407, manufactured by Tayca Corporation, average particle diameter 210 nm) to the solution while stirring the solution with a disper. Next, the pigment was sufficiently dispersed with a horizontal media disperser, and was filtered with a 10 μm membrane filter to obtain a titanium oxide aqueous pigment dispersion liquid. The pigment dispersion liquid was diluted to an optimal concentration and then observed with an optical microscope (400 magnifications) to confirm that the pigment dispersion liquid was in a favorable pigment dispersion state. The average particle diameter was 253 nm, and the viscosity was 40.6 mPa·s. Moreover, as a storage stability test, a storage test was conducted by storing the pigment dispersion liquid at 70° C. for 1 week. The titanium oxide pigment was precipitated, and a transparent supernatant liquid was observed. The precipitate was scratched with a spatula to find that the precipitate was somewhat viscous. Next, the pigment dispersion liquid with a precipitate was shaken 10 times, and the precipitate was disappeared. The dispersion state, when checked by the optical microscope as described above, was favorable, and the average particle size was 284 nm, and thus it was confirmed that the redispersibility with which the precipitate was redispersed was favorable. The pigment dispersion liquid is designated as aqueous titanium oxide pigment dispersion liquid-1 (Example 13).

Moreover, the same test was conducted changing the amount of the pigment dispersant and the amount of water to 32.4 parts and 67.2 parts respectively to confirm that the pigment dispersion state was similarly favorable. In the storage stability test, a precipitate of titanium oxide was observed, however a transparent supernatant was not observed. Next, the pigment dispersion liquid with a precipitate was shaken, and the precipitate disappeared to confirm that the precipitate was dispersed again. The dispersion liquid is designated as aqueous titanium oxide pigment dispersion liquid-2 (Example 14)

With a disper, 27.5 parts of the above-described aqueous titanium oxide pigment dispersion liquid-1 or 2, 3.6 parts of glycerin, 1.8 parts of 1,2-hexanediol, and 67.1 parts of water were stirred and homogenized, and the resultant mixture was filtered through a 10 μm filter and then through a 5 μm filter to prepare an ink having a pigment concentration of 16.5%. The ink in which aqueous titanium oxide pigment dispersion liquid-1 prepared above is used is designated as white ink-1, and the ink in which aqueous titanium oxide pigment dispersion liquid-2 prepared above is used is designated as white ink-2.

Since it would take a considerably long time to form precipitated hard cake by leaving the pigment dispersion liquid standing to store, the evaluation in which the movement of pigment particles in the solution was facilitated by forcibly applying centrifugal acceleration using a centrifugal separator was conducted as a method for forming the hard cake in a shorter time. The test method is shown below. The above-described white ink-1 or white ink-2 was diluted by 2 times with water to prepare a pseudo-ink having a pigment concentration of 8.25%. In a polypropylene microtube having a volume of 2 ml, 1.5 g of each pseudo-ink was weighed and placed, and centrifugal separation was conducted with a small centrifugal separator (Disc boy FB-4000, manufactured by Kurabo Industries Ltd.) by operating the centrifugal separator at 9000 rpm for 1 minute, thereby forcibly forming a precipitate in the bottom part of the microtube. Next, the microtube was held in a vertical direction so that the formed precipitate was on the lower side, and was left standing at room temperature for 30 minutes, and thereafter the precipitate was shaken and mixed by hand operation to redisperse the formed precipitate. The evaluation was conducted by the number of shaking at the time when the precipitate was redispersed and disappeared.

The precipitation acceleration test was conducted using the above-described inks and it was able to be confirmed that the precipitate was in the bottom. The microtube used for evaluation was held in the vertical direction, and then was shaken to find that the precipitate disappeared at 12 times of shaking by eye observation for ink-1 and that the precipitate disappeared at 5 times of shaking by eye observation for ink-2. As described above, it was confirmed that both inks had a favorable redispersibility, and particularly for white ink-2 in which the amount of the pigment dispersant was large, it was able to obtain a favorable result that precipitation was immediately recovered.

Moreover, a solid pattern was printed on beltlike black pattern-printed white paper using each of these inks with an inkjet printer "EM-930C" (manufactured by Seiko Epson Corp.) and the concealability at the beltlike black pattern-printed part was checked to find that both inks exhibited a high concealability. Next, printing was conducted on Xerox paper 4024 manufactured by Xerox Corporation, USA with a print mode of photo 360 dpi continuously for 1 hour. Clogging was not occurred for each ink, and favorable printing was able to be conducted for each ink without misdirections and without causing stripes on the printed paper.

<Application to Coloring Agents for Ultraviolet Ray Curable Type Inkjet Inks>

Examples 15 to 18

(a) Preparation of Pigment Dispersion Liquid-3

As preparation of coloring agents for ultraviolet ray curable type inkjet inks of yellow (Y), magenta (M), cyan (C), and Bk (black), each component including basic pigment dispersant-4 synthesized previously and shown in Table 11 was blended in an amount (parts) shown in Table 11 and stirred with a dissolver for 2 hours. After confirming that the lump of the pigment disappeared, dispersion treatment was conducted using a horizontal media disperser to prepare each pigment dispersion liquid (pigment coloring agent composition). In addition, in Table 11, the "synergist 5", the "synergist 6", and the "synergist 7" each are a dye derivative having an acidic group or acidic groups and represented by the structural formula (5) (n=1 to 2), the structural formula (6) (n=1 to 2), and the following structural formula (7) (n=1 to 2), respectively. Moreover, in Table 11, "PY-150" is LEVASCREEN Yellow manufactured by Lanxess AG., "PR 122" and "PB 15:4" are manufactured by Dainichiseika Color and Chemicals Mfg. Co., Ltd., and MB-1000 (manufactured by Mitsubishi Chemical Corporation) was used as carbon black.

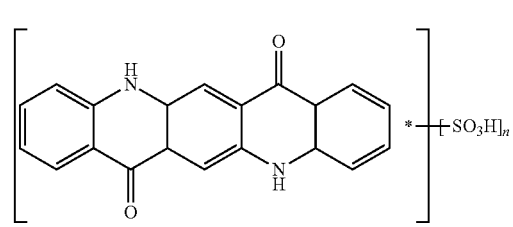

(7)

TABLE 11

Preparation of Pigment Dispersion Liquids (unit: part)

|  | Example 15 Y color pigment dispersion liquid | Example 16 M color pigment dispersion liquid | Example 17 C color pigment dispersion liquid | Example 18 Bk color pigment dispersion liquid |
|---|---|---|---|---|
| PY 150 | 20 | | | |
| PR 122 | | 20 | | |
| PB 15:4 | | | 20 | |
| Carbon black | | | | 20 |
| Basic pigment dispersant-4 | 26.7 | 26.7 | 26.7 | 26.7 |
| Synergist 5 | 2 | | | |
| Synergist 7 | | 2 | | |
| Synergist 6 | | | 2 | 1 |
| Isobornyl acrylate | 51.3 | 51.3 | 51.3 | 52.3 |
| Total | 100 | 100 | 100 | 100 |

(b) Evaluation of Pigment Dispersion Liquids-3

Measurement results of the average particle diameter of the pigments contained in the obtained pigment dispersion liquids and the measurement results of the initial viscosity and the viscosity after the pigment dispersion liquids were left standing at 70° C. for 1 week (viscosities after storage) are shown in Table 12.

TABLE 12

Physical Properties of Pigment Dispersion Liquids

|  | Example 15 Y color pigment dispersion liquid | Example 16 M color pigment dispersion liquid | Example 17 C color pigment dispersion liquid | Example 18 Bk color pigment dispersion liquid |
|---|---|---|---|---|
| Average particle diameter (nm) | 101 | 124 | 89 | 99 |
| Average particle diameter after storage (nm) | 99 | 119 | 90 | 86 |
| Initial viscosity (mPa · s) | 20.0 | 29.8 | 18.3 | 18.9 |
| Viscosity after storage (mPa · s) | 19.6 | 28.6 | 18.1 | 18.6 |

As shown in Table 12, it is understood that the average particle diameters of the pigments contained in the pigment dispersion liquids are nearly 100 nm and that the initial viscosities are low. Next, the changes in average particle diameters and viscosities were not observed in the storage stability test to find that the average particle diameters and viscosities were extremely stable.

Example 19

Added and mixed were 33.3 parts of acidic pigment dispersant-5 synthesized previously, 66.7 parts of isobornyl acrylate, and 100 parts of titanium oxide (JR-405, manufactured by Tayca Corporation, average particle diameter 240 nm), and the resultant mixture was stirred with a dissolver for 2 hours. After confirming that the lump of the pigment disappeared, dispersion treatment was conducted using a horizontal media disperser to prepare a pigment dispersion liquid. The obtained white (W) pigment dispersion liquid was passed through a 10 μm filter and then through a 5 μm filter. During the filtration, clogging of filters was not observed at all. The average particle diameter of the pigment contained in the obtained white pigment dispersion liquid was 234 nm, and the viscosity was 10.5 mPa·s.

The white pigment dispersion liquid obtained above was put into a light-shielding glass bottle and was left standing in a thermostatic chamber the temperature of which is set to 60° C. for 1 month, and the change in the viscosity and the particle size, the observation of the existence of a supernatant or not and the existence of a precipitate or not, and whether the precipitate, if existed, disappeared by shaking were tested. As a result thereof, the average particle diameter was 206 nm, and the viscosity was 10.6 mPa·s. It was able to be confirmed that the change in physical properties due to the storage was not observed and a high degree of dispersion stability was maintained. A supernatant was not observed at all. The existence of some precipitates was confirmed, and the precipitates, when scratched with a spatula, were observed to be viscous to some extent. Next, the precipitates, when shaken, almost disappeared, and the state of the pigment dispersion liquid returned to the same as the initial state. The average particle diameter after shaking was measured to be 245 nm, and it was able to be confirmed that the average particle diameter became large to some extent due to aggregation in the precipitates but the precipitates was dispersed again to make a favorable dispersion state.

Each color pigment dispersion liquid of Y, M, C, Bk, and W of Examples 15 to 19 is highly dispersed and has a high stability and therefore is considered to be suitable for ultraviolet ray curable type inks. Each color pigment dispersion liquid described above is considered to be particularly optimal for ultraviolet ray curable type inkjet inks for which ejection stability and high speed printability are required because in the pigment dispersion liquid, the aggregation of pigments does not occur, the pigments are finely dispersed and highly stable and, in the case of titanium oxide, the dispersion is recovered even when the precipitation occurs.

INDUSTRIAL APPLICABILITY

According to the present invention, by dispersing a pigment in a liquid medium using a pigment dispersant containing, as a main component, a graft copolymer having a particular structure obtained only through the living radical polymerization utilized in the present invention, a pigment dispersion liquid in which a pigment is finely dispersed at a high level that has never been achieved with convention pigment dispersants and which has a high storage stability can be obtained. The pigment dispersion liquid is extremely suitable for coloring agents for paints, inks, coating agents, and so on, particularly suitable for coloring agents for inkjet inks and color filters for which micronization and storage stability at a high level are required, and a wide range of utilization of the pigment dispersion liquid is expected.

The invention claimed is:

1. A pigment dispersant comprising: as a main component, a polymer obtained by living radical polymerization of raw material monomers in the presence of a polymerization-initiating compound,
    wherein the polymer is a graft copolymer formed from two or more monomers as the raw material monomers, comprising:
        a methacrylate (A) having an acidic group or a basic group;
        a methacrylate-based macromonomer (B) having weight average molecular weight in a range from 500 to 5000 and having a methacrylate residue at one terminal of any one of polymer chains selected from the group consisting of polyalkylene (C2 to C4) glycol chains, polyalkylene (C2 to C4) glycol monoalkyl (C1 to C18) ether chains, and poly(hydroxyalkyl (C2 to C18) carboxylic acid) chains; and
        optionally other methacrylate-based monomer than the methacrylate (A) and the methacrylate-based macromonomer (B),
    the graft copolymer has a main chain made of a methacrylate (A)-derived polymer having an acidic group or a basic group bonded thereto; and a side chain made of a macromonomer (B)-derived polymer chain,
    the graft copolymer has an average degree of polymerization in a range from 20 to 50,
    a mass ratio of the polymer chain selected from the group consisting of the polyalkylene (C2 to C4) glycol chains, the polyalkylene (C2 to C4) glycol monoalkyl (C1 to C18) ether chains, and the poly(hydroxyalkyl (C2 to C18) carboxylic acid) chains relative to the graft copolymer is in a range from 50 to 90 mass %, and
    the methacrylate-based macromonomer (B) has the methacrylate residue at the one terminal of the any one of the polymer chains through a urea bond.

2. The pigment dispersant according to claim 1,
    wherein a molar ratio of the methacrylate-based macromonomer (B) relative to a total amount of methacrylate-based monomers is in a range from 10 to 50%, where the total amount of the methacrylate-based monomers are a total amount of the methacrylate (A), the methacrylate-based macromonomer (B), and the other methacrylate-based monomer.

3. The pigment dispersant according to 1,
    wherein the graft copolymer as the main component has number average molecular weight in a range from 5000 to 25000, and
    the graft copolymer has an acid value in a range from 15 to 70 mgKOH/g or an amine value of from 15 to 70 mgKOH/g.

4. The pigment dispersant according to claim 1,
    wherein the methacrylate (A) has a sulfonate group or a phosphate group.

5. A pigment dispersion liquid, which is a dispersion of the pigment dispersant according to claim 1 and a pigment in one or more liquid media selected from the group consisting of water, organic solvents, and polymerizable compounds.

6. A method for producing the pigment dispersant according to claim 1, the method comprising:
    obtaining the graft copolymer by subjecting the raw material monomers to the living radical polymerization in the presence of the polymerization-initiating compound,
    wherein as the raw material monomers, the two or more monomers comprise:
        the methacrylate (A) having the acidic group or the basic group; and the methacrylate-based macromonomer (B); and
optionally the other methacrylate-based monomer,
a molar ratio of a total amount of methacrylate-based monomers in the raw material monomers relative to the polymerization-initiating compound, is in a range from 20 to 50 mol relative to 1 mol of the polymerization-initiating compound, where the total amount of the methacrylate-based monomers are a total amount of the methacrylate (A), the methacrylate-based macromonomer (B), and the other methacrylate-based monomer.

7. The method according to claim 6,
wherein the polymerization-initiating compound is at least one compound selected from the group consisting of iodine and iodine compounds.

8. A pigment dispersant comprising: as a main component, a polymer obtained by living radical polymerization of raw material monomers in the presence of a polymerization-initiating compound,
wherein the polymer is a graft copolymer formed from two or more monomers as the raw material monomers, comprising:
a methacrylate (A) having an acidic group, which is a sulfonate group or a phosphate group;
a methacrylate-based macromonomer (B) having weight average molecular weight in a range from 500 to 5000 and having a methacrylate residue at one terminal of any one of polymer chains selected from the group consisting of polyalkylene (C2 to C4) glycol chains, polyalkylene (C2 to C4) glycol monoalkyl (C1 to C18) ether chains, and poly(hydroxyalkyl (C2 to C18) carboxylic acid) chains; and
optionally other methacrylate-based monomer than the methacrylate (A) and the methacrylate-based macromonomer (B),
the graft copolymer has a main chain made of a methacrylate (A)-derived polymer having an acidic group bonded thereto; and a side chain made of a macromonomer (B)-derived polymer chain,
the graft copolymer has an average degree of polymerization in a range from 20 to 50, and
a mass ratio of the polymer chain selected from the group consisting of the polyalkylene (C2 to C4) glycol chains, the polyalkylene (C2 to C4) glycol monoalkyl (C1 to C18) ether chains, and the poly(hydroxyalkyl (C2 to C18) carboxylic acid) chains relative to the graft copolymer is in a range from 50 to 90 mass %.

9. A method for producing the pigment dispersant according to claim 8, the method comprising:
obtaining the graft copolymer by subjecting the raw material monomers to the living radical polymerization in the presence of the polymerization-initiating compound,
wherein as the raw material monomers, the two or more monomers comprise:
the methacrylate (A) having the acidic group;
the methacrylate-based macromonomer (B); and
optionally the other methacrylate-based monomer,
a molar ratio of a total amount of methacrylate-based monomers in the raw material monomers relative to the polymerization-initiating compound, is in a range from 20 to 50 mol relative to 1 mol of the polymerization-initiating compound, where the total amount of the methacrylate-based monomers are a total amount of the methacrylate (A), the methacrylate-based macromonomer (B), and the other methacrylate-based monomer.

10. The pigment dispersant according to claim 8,
wherein a molar ratio of the methacrylate-based macromonomer (B) relative to a total amount of methacrylate-based monomers is in a range from 10 to 50%, where the total amount of the methacrylate-based monomers are a total amount of the methacrylate (A), the methacrylate-based macromonomer (B), and the other methacrylate-based monomer.

11. The pigment dispersant according to claim 8,
wherein the graft copolymer as the main component has number average molecular weight in a range from 5000 to 25000, and
the graft copolymer has an acid value in a range from 15 to 70 mgKOH/g.

* * * * *